US011083186B2

(12) United States Patent
Poché

(10) Patent No.: US 11,083,186 B2
(45) Date of Patent: Aug. 10, 2021

(54) SELECTIVE ACCESS SYSTEM FOR A FEEDER

(71) Applicant: Scimetrics Limited Corp., Wellington, CO (US)

(72) Inventor: Richard Poché, Wellington, CO (US)

(73) Assignee: Scimetrics Limited Corp., Wellington, CO (US)

(*) Notice: Subject to any disclaimer, the term of this patent is extended or adjusted under 35 U.S.C. 154(b) by 434 days.

(21) Appl. No.: 15/835,293

(22) Filed: Dec. 7, 2017

(65) Prior Publication Data

US 2018/0098532 A1 Apr. 12, 2018

Related U.S. Application Data

(63) Continuation-in-part of application No. 14/947,088, filed on Nov. 20, 2015, now abandoned.

(51) Int. Cl.
*A01M 25/00* (2006.01)
*A01K 5/02* (2006.01)

(52) U.S. Cl.
CPC ............. *A01M 25/002* (2013.01); *A01K 5/02* (2013.01); *A01K 5/025* (2013.01); *A01M 2200/00* (2013.01)

(58) Field of Classification Search
CPC ....... A01K 5/02; A01K 5/025; A01M 25/002; A01M 2200/00
USPC .......................................................... 43/131
See application file for complete search history.

(56) References Cited

U.S. PATENT DOCUMENTS

| | | | |
|---|---|---|---|
| 1,011,207 A | 12/1911 | Kemp | |
| 1,093,691 A | 4/1914 | Fritsch | |
| 1,307,763 A | 6/1919 | Sterbenz | |
| 1,358,525 A * | 11/1920 | Cottrel | ................ A01K 5/0241 |
| | | | 119/53.5 |

(Continued)

FOREIGN PATENT DOCUMENTS

JP 2002-272352 9/2002

OTHER PUBLICATIONS

PestSmart, "Use of the HogHopper(R) for baiting of feral pigs", https://www.youtube.com/watch?v=KpafwuZENcY, posted to YouTube on Mar. 19, 2012 and retreived from the Internet on Feb. 13, 2020. (Year: 2012).*

(Continued)

*Primary Examiner* — Claude J Brown
(74) *Attorney, Agent, or Firm* — Craig R. Miles; CR Miles P.C.

(57) ABSTRACT

A selective access system, and methods of making and using such a selective access system, whereby the selective access system includes a container including an interior space defined by a side wall disposed between opposing top and bottom walls; an opening disposed within the side wall, the opening communicating with the interior space; a cover slidably engaged with the container, the cover configured to slide upward and downward between a first position and a second position; whereby in the first position, the cover overlays the opening; and whereby in the second position, the cover disposes away from at least a portion of the opening to permit access to the interior space; and a force generator coupled to the cover, the force generator generating a pre-selected force amount which when unopposed, provides the first position of the cover.

20 Claims, 21 Drawing Sheets

(56) References Cited

U.S. PATENT DOCUMENTS

| | | | |
|---|---|---|---|
| 1,532,584 A | | 4/1925 | Hanson et al. |
| 1,886,593 A | * | 11/1932 | Rupprecht ............ A01K 39/012 119/55 |
| 2,188,652 A | | 1/1940 | Cress |
| 2,651,138 A | | 9/1953 | Malloy |
| 4,384,376 A | * | 5/1983 | Shrode .................... A47K 3/30 4/596 |
| 4,766,692 A | | 8/1988 | Shudren |
| 5,170,749 A | * | 12/1992 | Collie, III ................ A01K 5/00 119/51.01 |
| 5,864,982 A | | 2/1999 | Tully et al. |
| 6,264,969 B1 | | 7/2001 | Poche |
| 2006/0103279 A1 | * | 5/2006 | Lai ......................... A47B 88/57 312/333 |
| 2008/0160058 A1 | | 7/2008 | Staples |
| 2011/0268692 A1 | | 11/2011 | Endepols |
| 2014/0341840 A1 | | 11/2014 | Bajomi et al. |
| 2016/0007589 A1 | | 1/2016 | Lockman et al. |
| 2016/0227736 A1 | | 8/2016 | Monk |

OTHER PUBLICATIONS

HOGHOPPER(TM) Pamphlet, 2012 (Year: 2012).*
PCT International Patent Application No. PCT/US18/12681; International Search Report and Written Opinion of the International Searching Authority dated Mar. 5, 2018, 15 pages.
McIlroy et al. Effectiveness of a Warfarin-poisoning Campaign against Feral Pigs, *Sus scrofa*, in Namadgi National Park, A.C.T.; Aust. Wildl. Res, 1989, 16, pp. 195-202.
Saunders et al. Evaluation of a Warfarin Poisoning Programme for Feral Pigs (*Sus scrofa*); Aust. Wildl. Res, 1990, 17, pp. 525-533.
Texas Department of Agriculture. Grant Agreement, dated Nov. 2014; 83 pages total.
International PCT Patent Application No. PCT/US17/36869; International Search Report and Written Opinion of the International Searching Authority dated Jun. 9, 2017, 13 pages.
Animal Control Technologies (Australia). Hoghopper bait delivery system. Website, http://www.animalcontrol.com.au, originally downloaded Jan. 23, 2017, 2 pages.
Animal Control Technologies (Australia). Hoghopper. Responsible Feral Pig Management. Website, http://www.animalcontrol.com.au, originally downloaded Jan. 23, 2017, 4 pages.
Animal Control Technologies (Australia). Hoghopper .Feral Pig Bait Delivery Device. Website, http://www.animalcontrol.com.au, originally downloaded Jan. 23, 2017, 8 pages.
Genesis Laboratories, Inc. Feral Hog Control Using a New Bait. PowerPoint Presentation, originally downloaded Apr. 22, 2016, 29 pages.
U.S. Appl. No. 14/947,088, filed Nov. 20, 2015.
U.S. Appl. No. 15/241,840, filed Aug. 19, 2016.
U.S. Appl. No. 15/701,286, filed Sep. 11, 2017.
U.S. Appl. No. 15/701,316, filed Sep. 11, 2017.

* cited by examiner

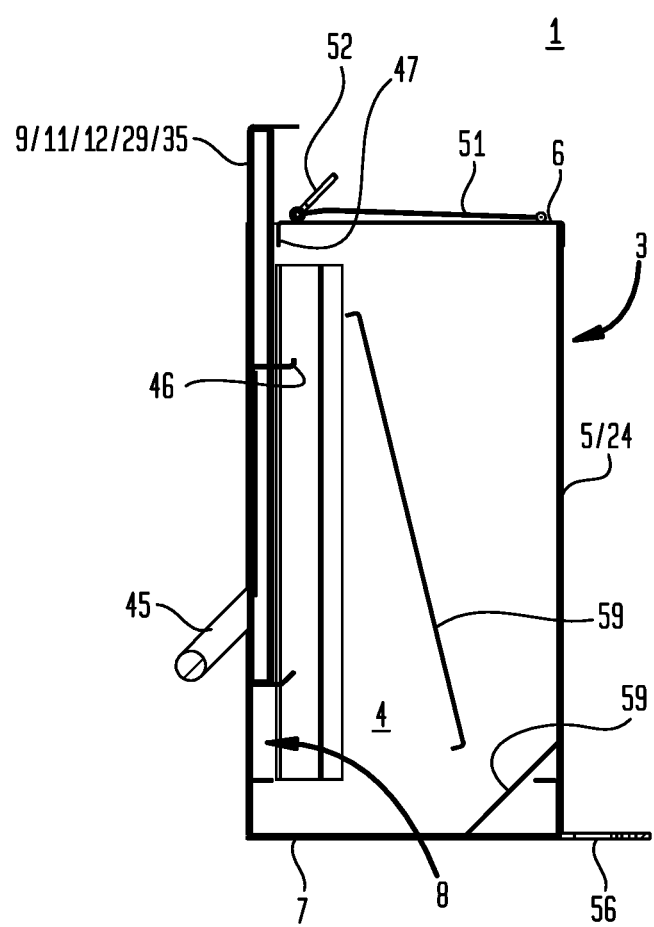

SELECTIVE ACCESS SYSTEM FOR A FEEDER

This United States Patent Application is a continuation-in-part of U.S. patent application Ser. No. 14/947,088, filed Nov. 20, 2015, hereby incorporated by reference herein.

I. SUMMARY OF THE INVENTION

A broad object of a particular embodiment of the invention can be to provide a selective access system, and methods of making and using such a selective access system, whereby the selective access system includes a container including an interior space defined by a side wall disposed between opposing top and bottom walls; an opening disposed within the side wall, the opening communicating with the interior space; a cover slidably engaged with the container, the cover configured to slide upward and downward between a first position and a second position; whereby in the first position, the cover overlays the opening; and whereby in the second position, the cover disposes away from at least a portion of the opening to permit access to the interior space; and a force generator coupled to the cover, the force generator generating a pre-selected force amount which when unopposed, provides the first position of the cover.

Naturally, further objects of the invention are disclosed throughout other areas of the specification, drawings, and claims.

II. BRIEF DESCRIPTION OF THE DRAWINGS

FIG. 3H is a cross-sectional view of the particular embodiment of the selective access system shown in FIG. 3B.

III. DETAILED DESCRIPTION OF THE INVENTION

Figure 1:
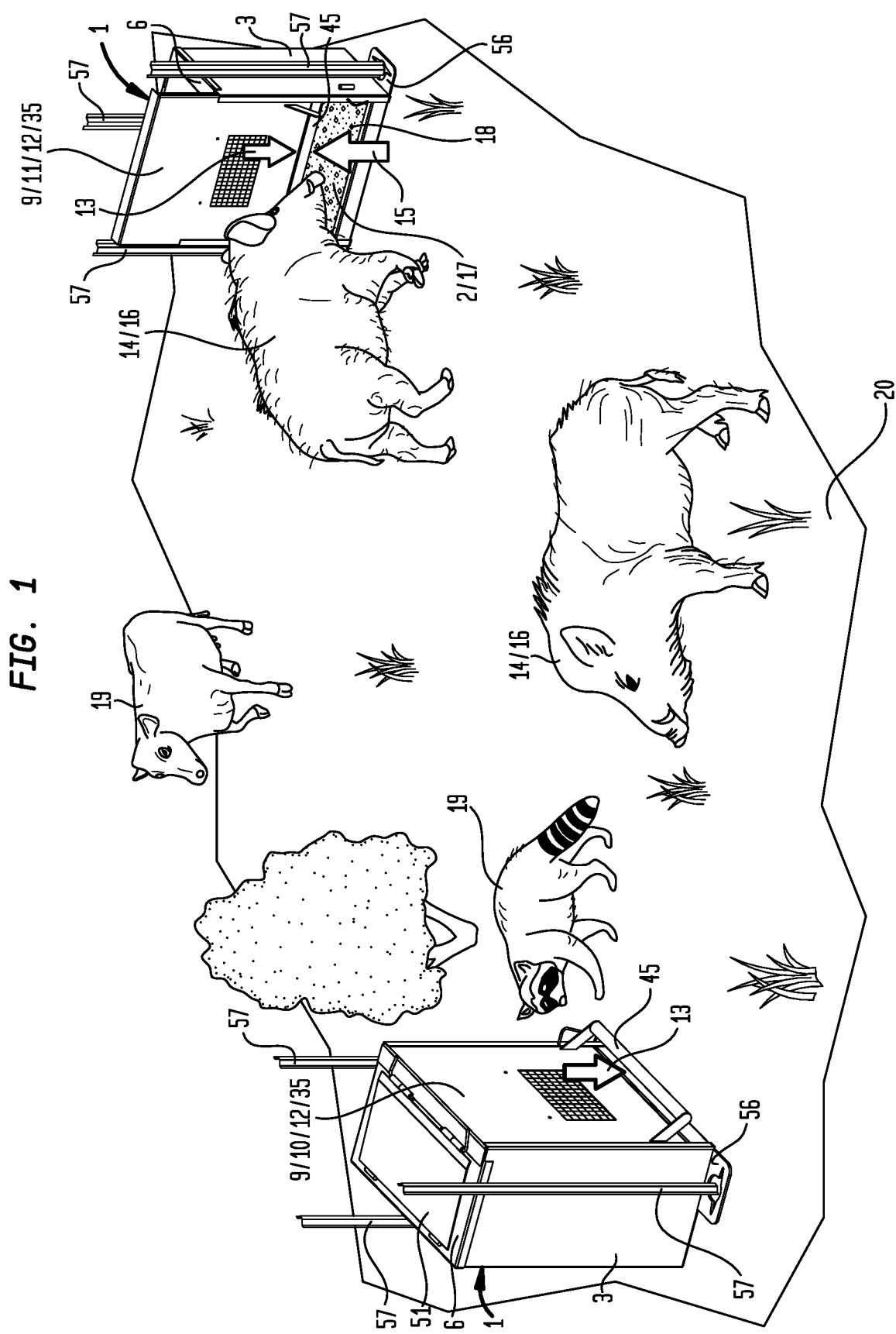
FIG. 1 is an illustration of a method of using a particular embodiment of the selective access system to permit selective access to ingestible matter disposed within the interior space of a container, whereby the ingestible material comprises bait including a toxic agent.
Figure 2A:
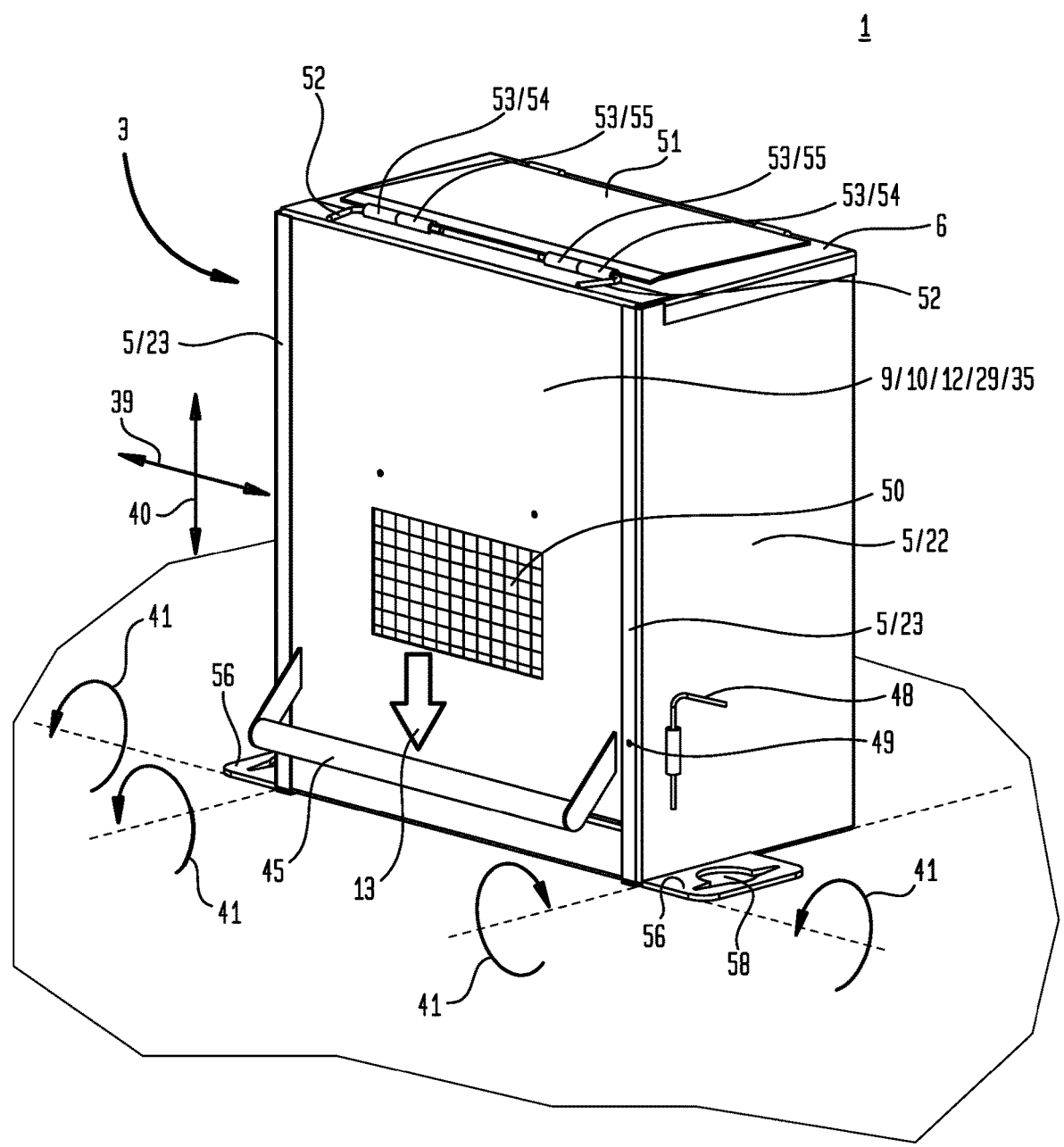
FIG. 2A is a perspective view of a particular embodiment of the selective access system having a cover disposed in a first position.
Figure 2B:
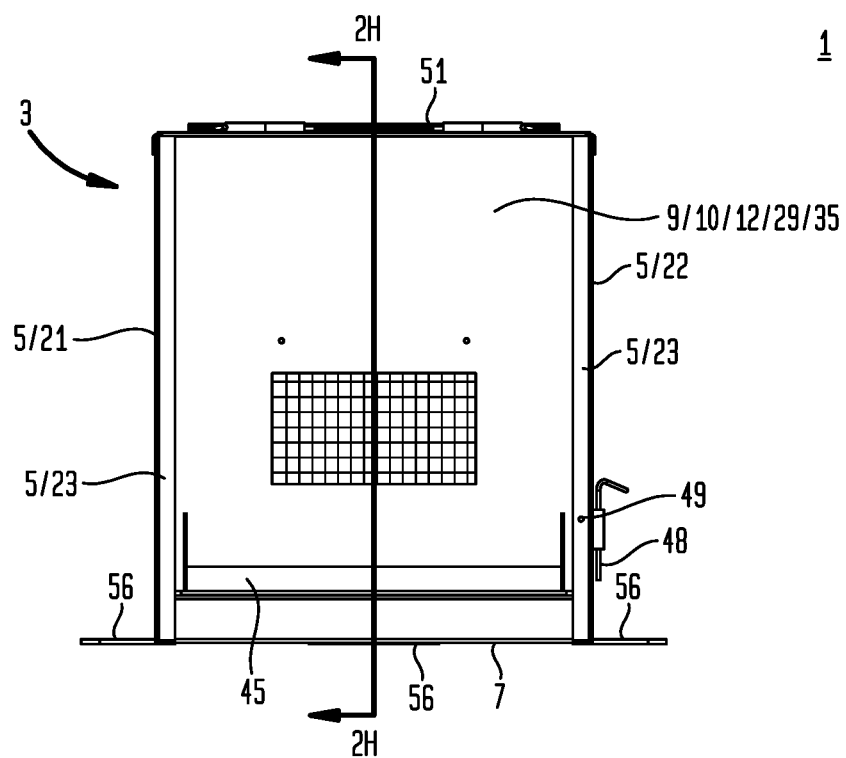
FIG. 2B is a front view of the particular embodiment of the selective access system shown in FIG. 2A.
Figure 2C:
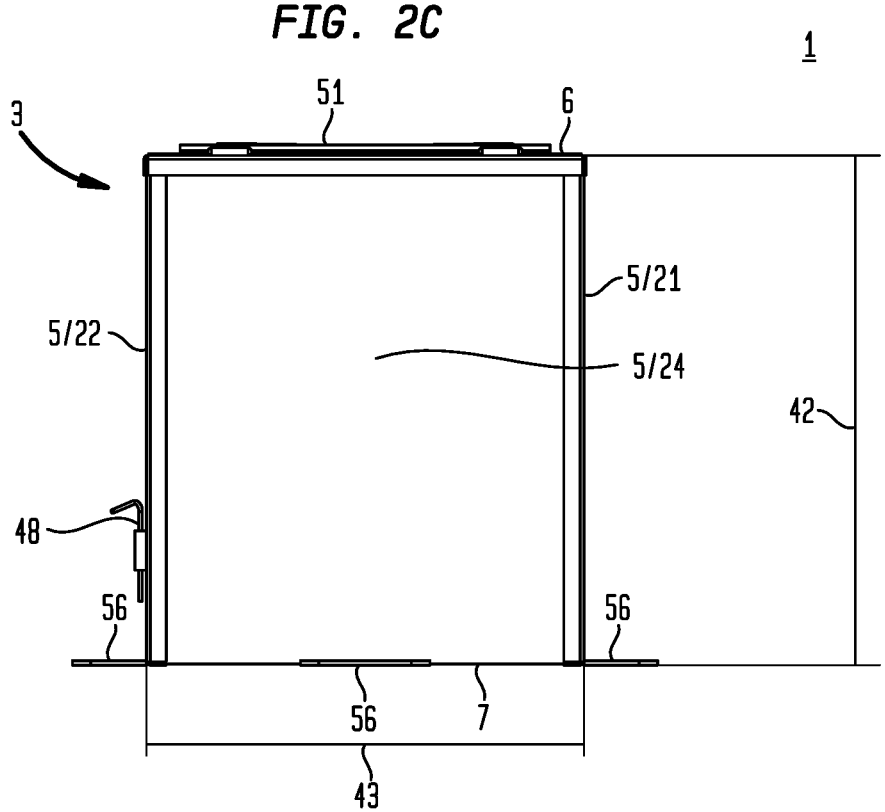
FIG. 2C is a rear view of the particular embodiment of the selective access system shown in FIG. 2A.
Figure 2D:
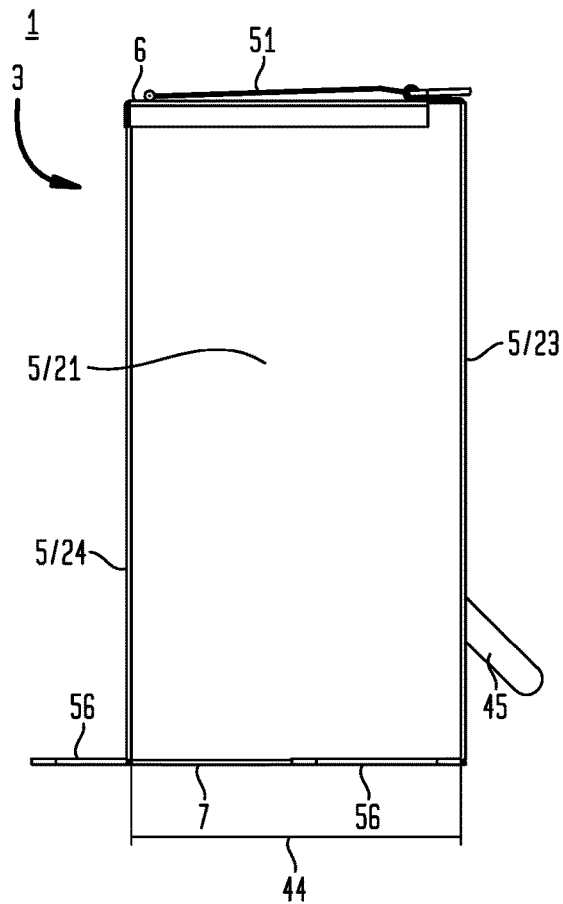
FIG. 2D is a first side view of the particular embodiment of the selective access system shown in FIG. 2A.
Figure 2E:
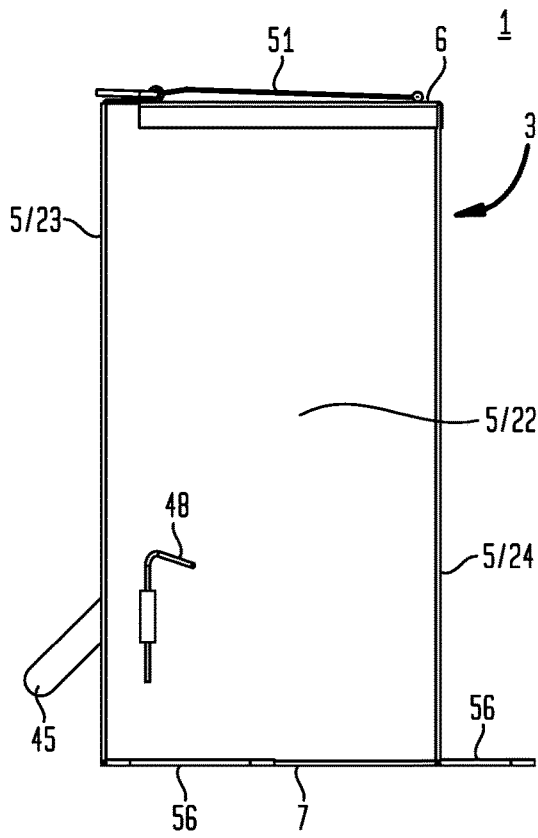
FIG. 2E is a second side view of the particular embodiment of the selective access system shown in FIG. 2A.
Figure 2F:
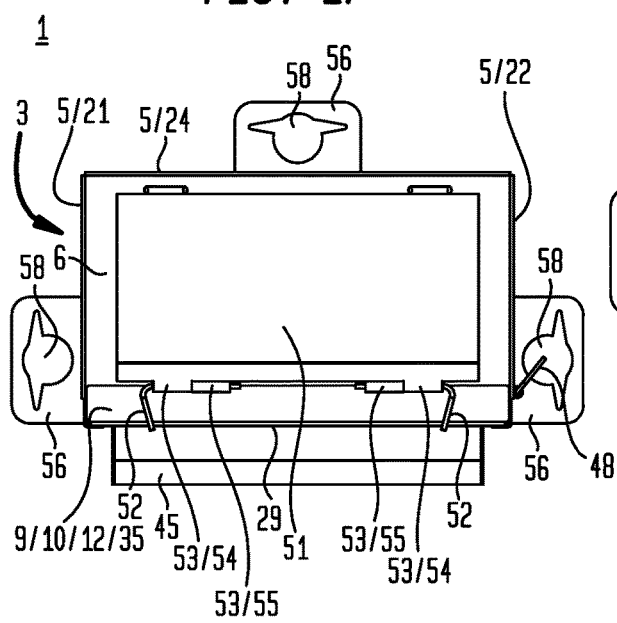
FIG. 2F is a top view of the particular embodiment of the selective access system shown in FIG. 2A.
Figure 2G:
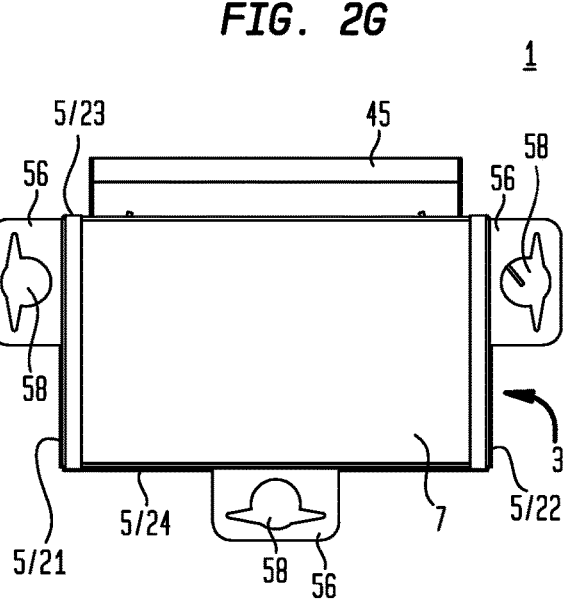
FIG. 2G is a bottom view of the particular embodiment of the selective access system shown in FIG. 2A.
Figure 2H:
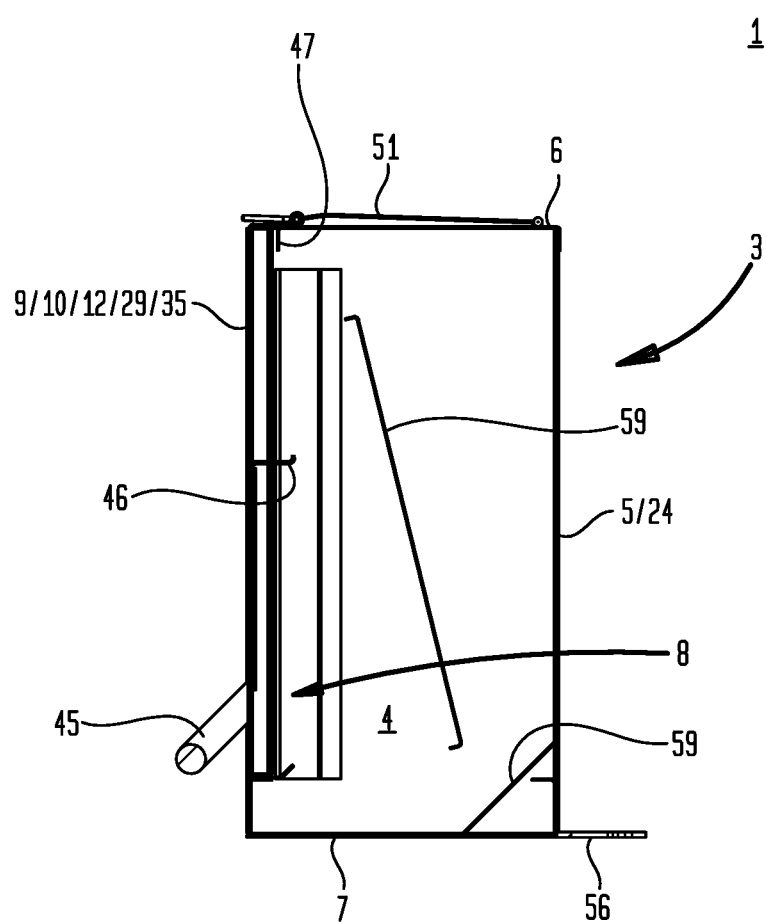
FIG. 2H is a cross-sectional view of the particular embodiment of the selective access system shown in FIG. 2B.
Figure 3A:
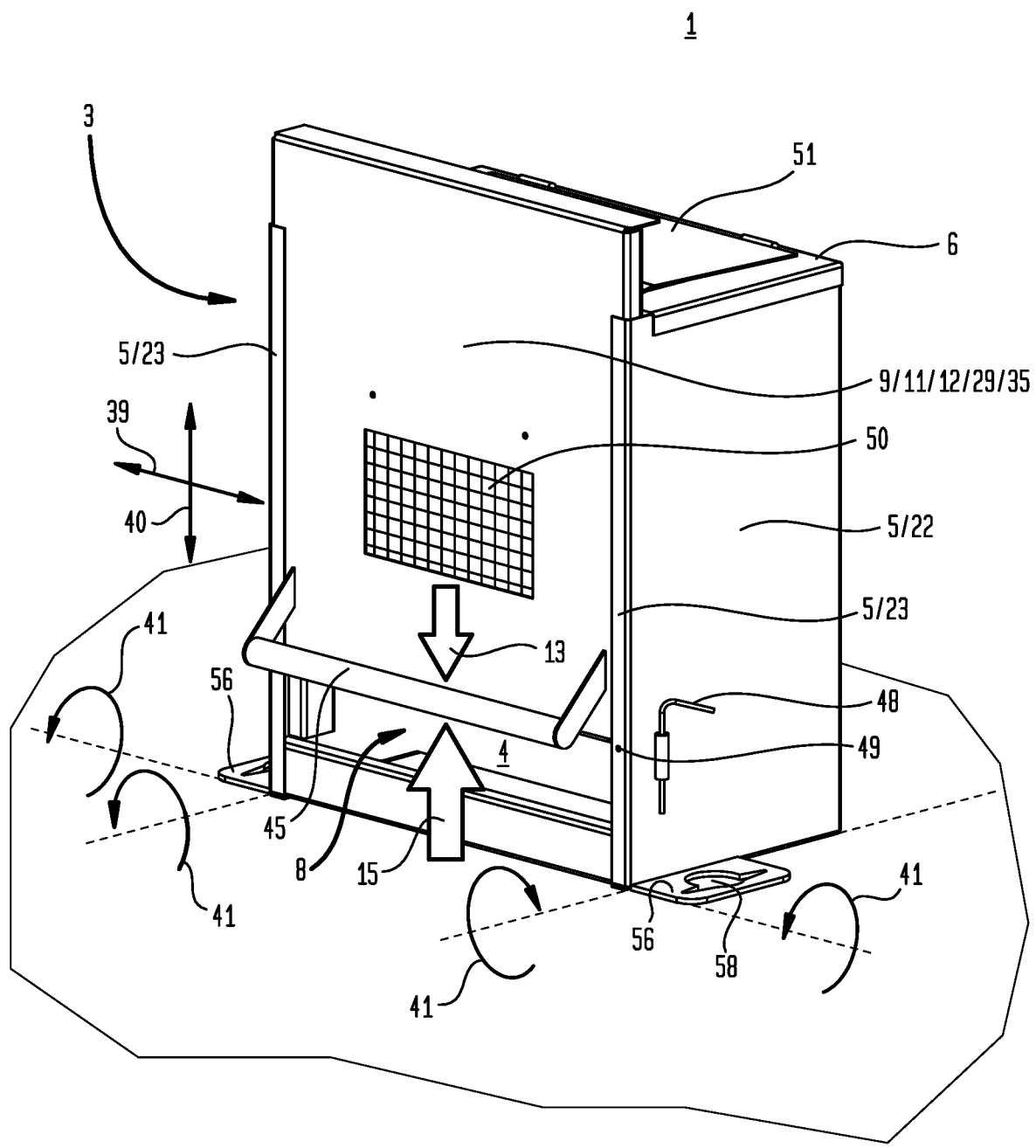
FIG. 3A is a perspective view of a particular embodiment of the selective access system having a cover disposed in a second position.
Figure 3B:
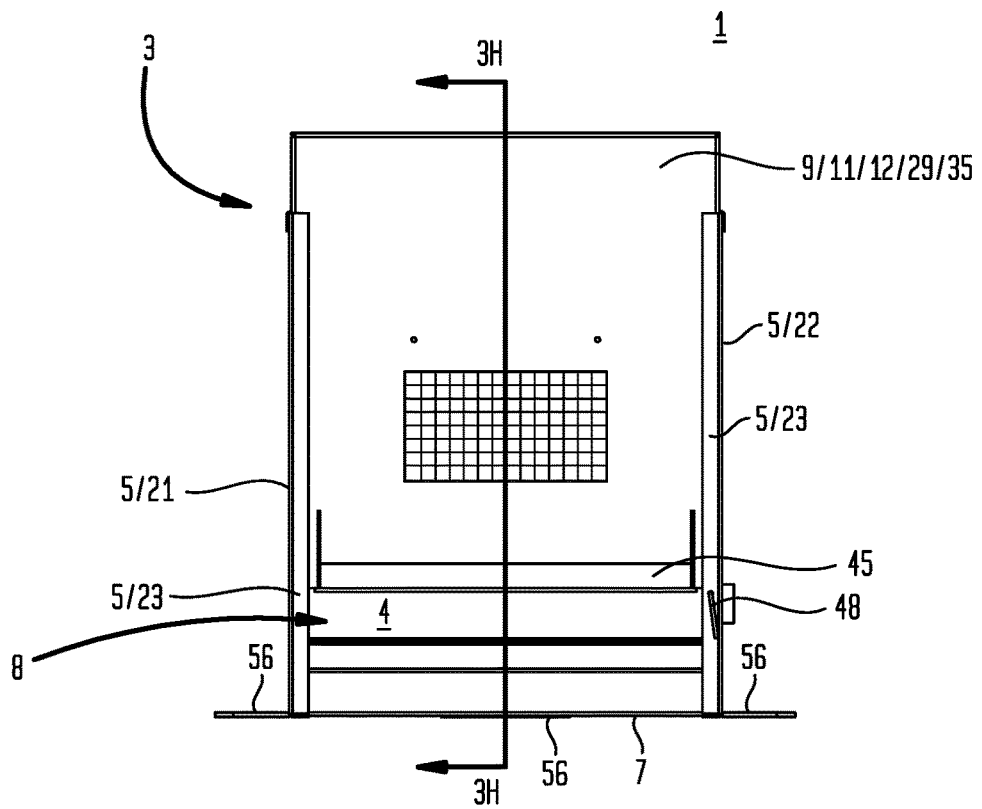
FIG. 3B is a front view of the particular embodiment of the selective access system shown in FIG. 3A.
Figure 3C:
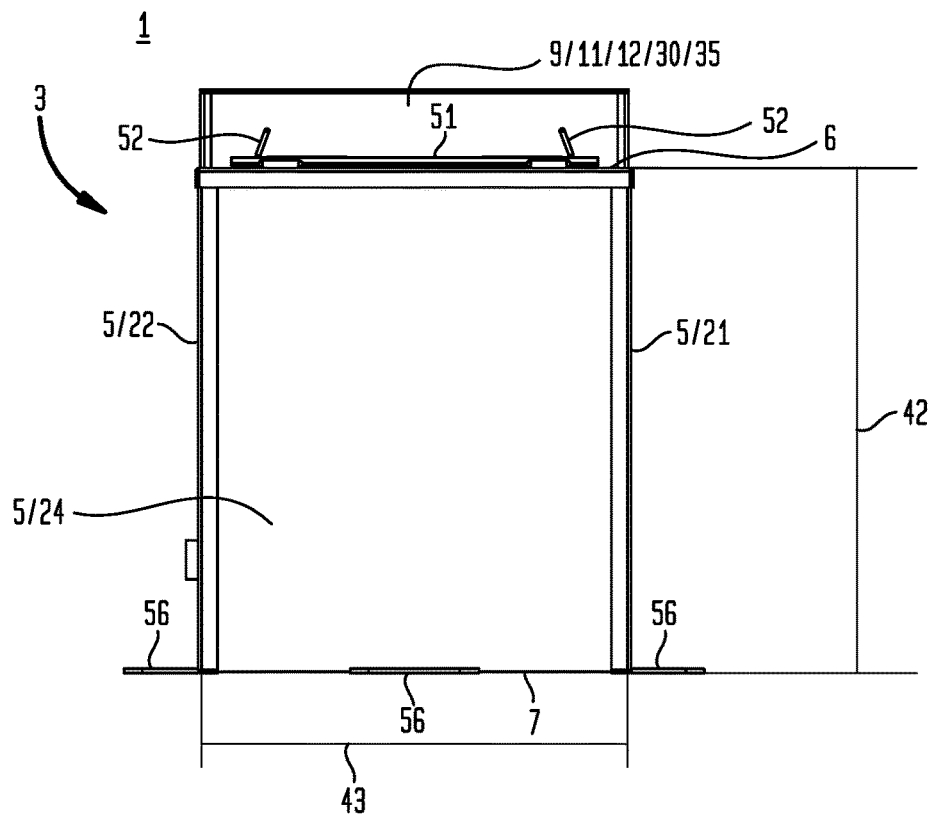
FIG. 3C is a rear view of the particular embodiment of the selective access system shown in FIG. 3A.
Figure 3D:
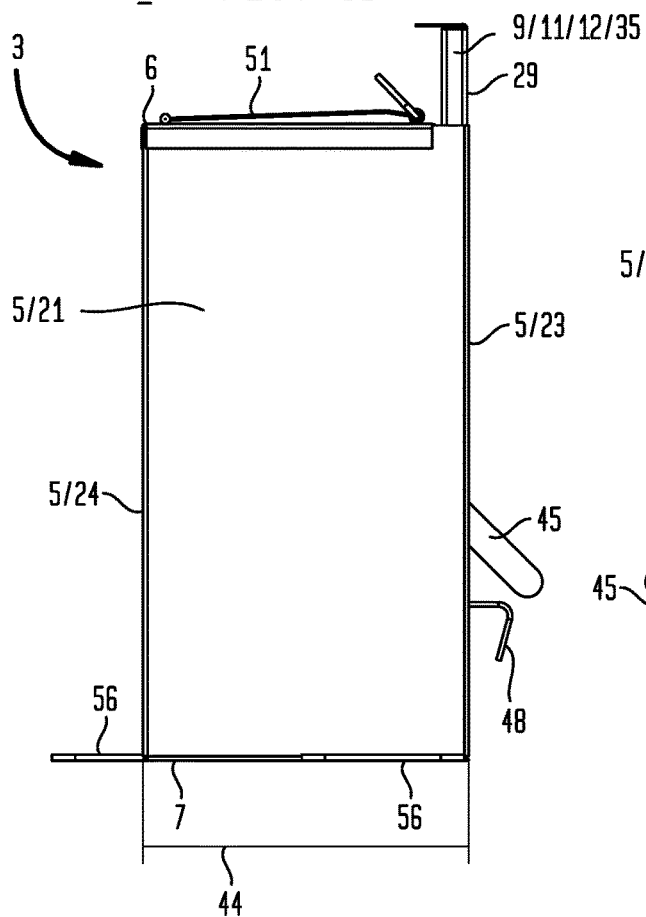
FIG. 3D is a first side view of the particular embodiment of the selective access system shown in FIG. 3A.
Figure 3E:
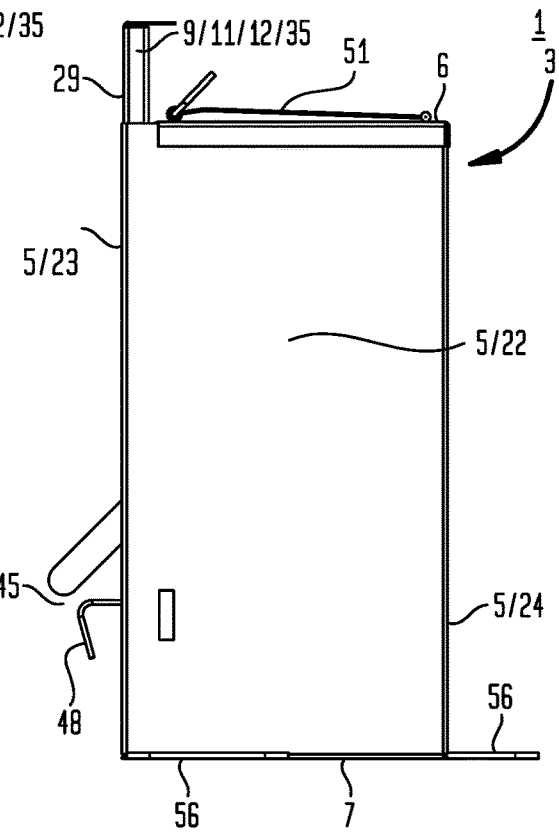
FIG. 3E is a second side view of the particular embodiment of the selective access system shown in FIG. 3A.
Figure 3F:
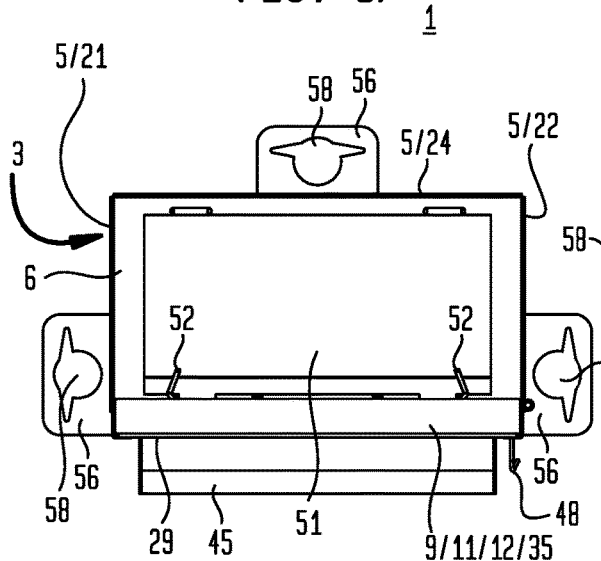
FIG. 3F is a top view of the particular embodiment of the selective access system shown in FIG. 3A.
Figure 3G:
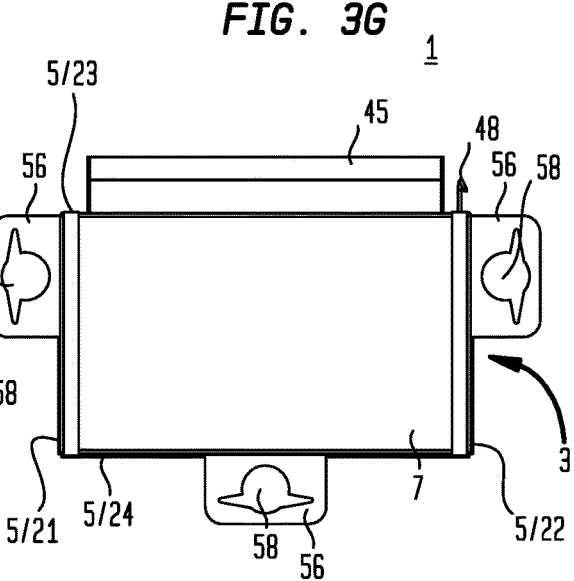
FIG. 3G is a bottom view of the particular embodiment of the selective access system shown in FIG. 3A.
Figure 4A:
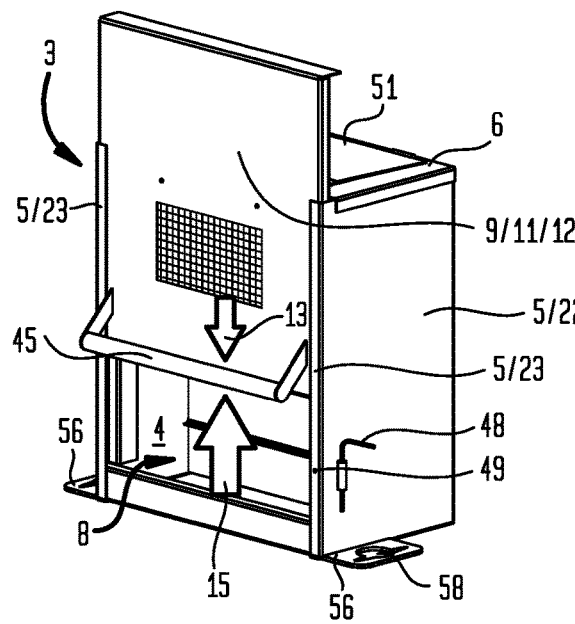
FIG. 4A is a perspective view of a particular embodiment of the selective access system having a cover disposed in a second position.
Figure 4B:
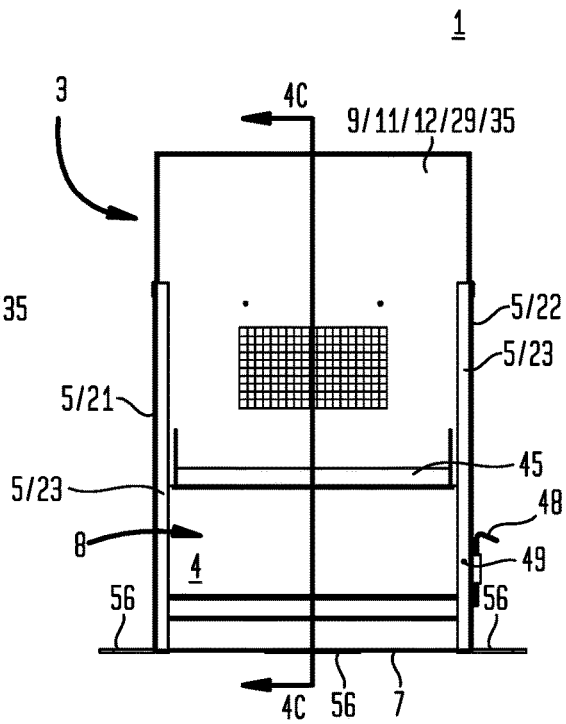
FIG. 4B is a front view of the particular embodiment of the selective access system shown in FIG. 4A.
Figure 4C:
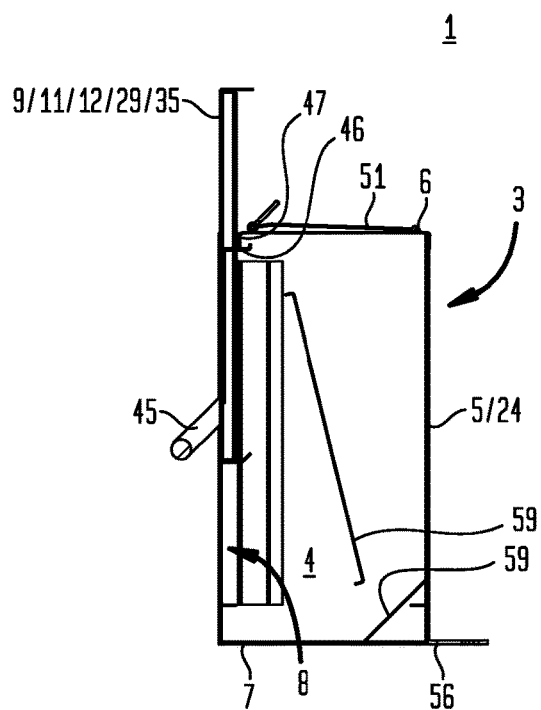
FIG. 4C is a cross-sectional view of the particular embodiment of the selective access system shown in FIG. 4B.
Figure 5A:
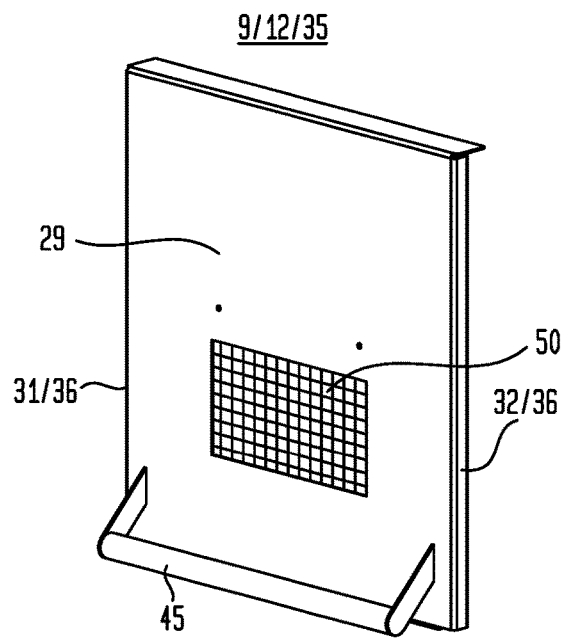
FIG. 5A is a front perspective view of a particular embodiment of a cover of the selective access system.
Figure 5B:
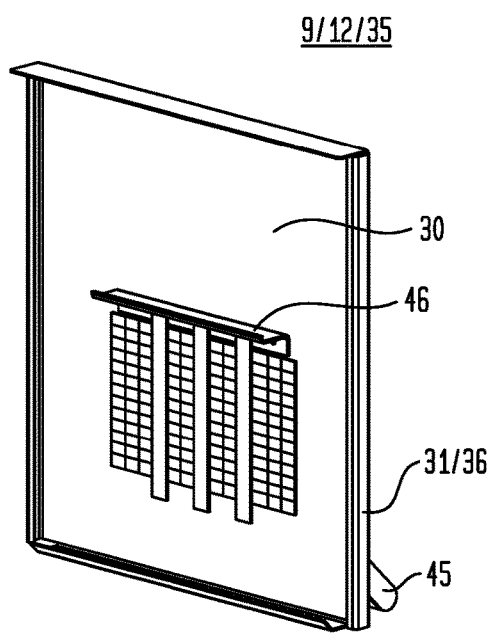
FIG. 5B is a rear perspective view of the particular embodiment of the cover shown in FIG. 5A.
Figure 5C:
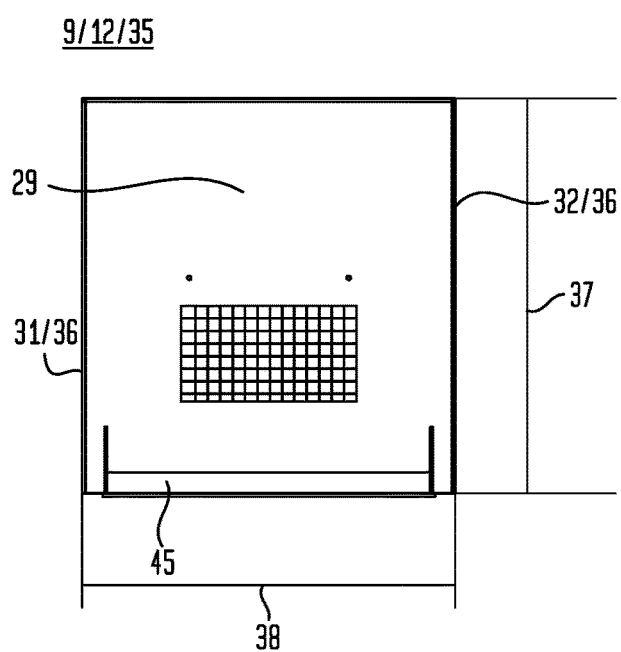
FIG. 5C is a front view of the particular embodiment of the cover shown in FIG. 5A.
Figure 5D:
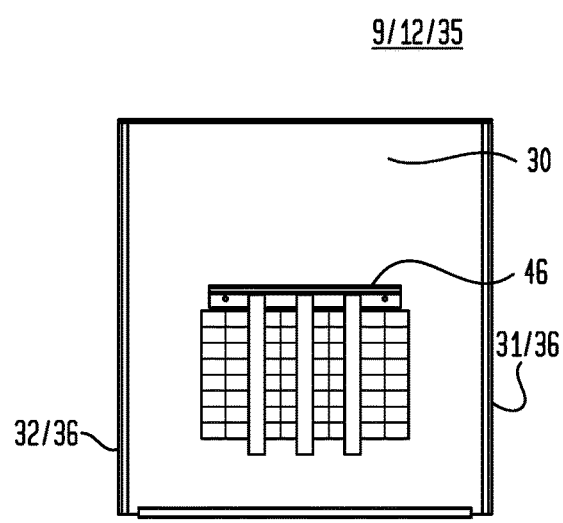
FIG. 5D is a rear view of the particular embodiment of the cover shown in FIG. 5A.
Figure 5E:
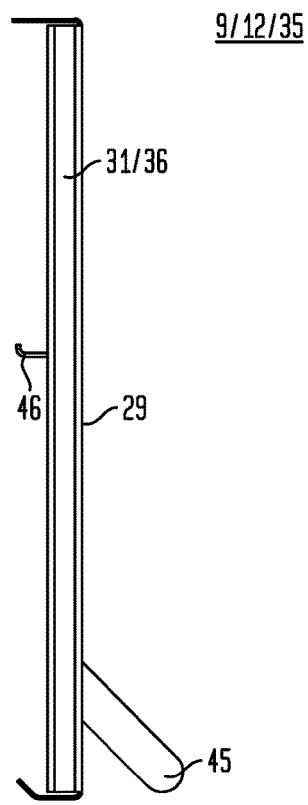
FIG. 5E is a first side view of the particular embodiment of the cover shown in FIG. 5A.
Figure 5F:
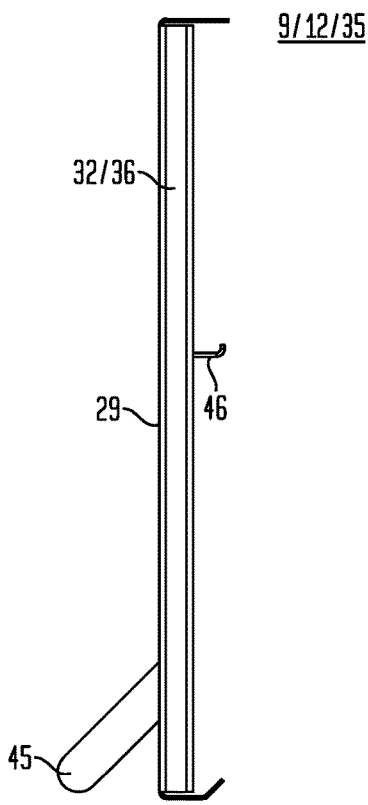
FIG. 5F is a second side view of the particular embodiment of the cover shown in FIG. 5A.
Figure 5G:
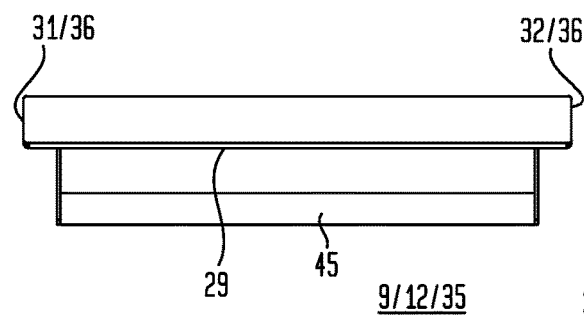
FIG. 5G is a top view of the particular embodiment of the cover shown in FIG. 5A.
Figure 5H:
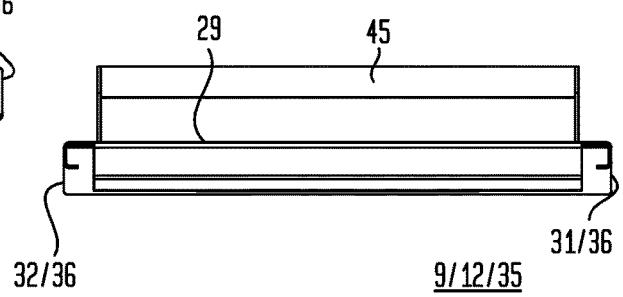
FIG. 5H is a bottom view of the particular embodiment of the cover shown in FIG. 5A.
Figure 6A:
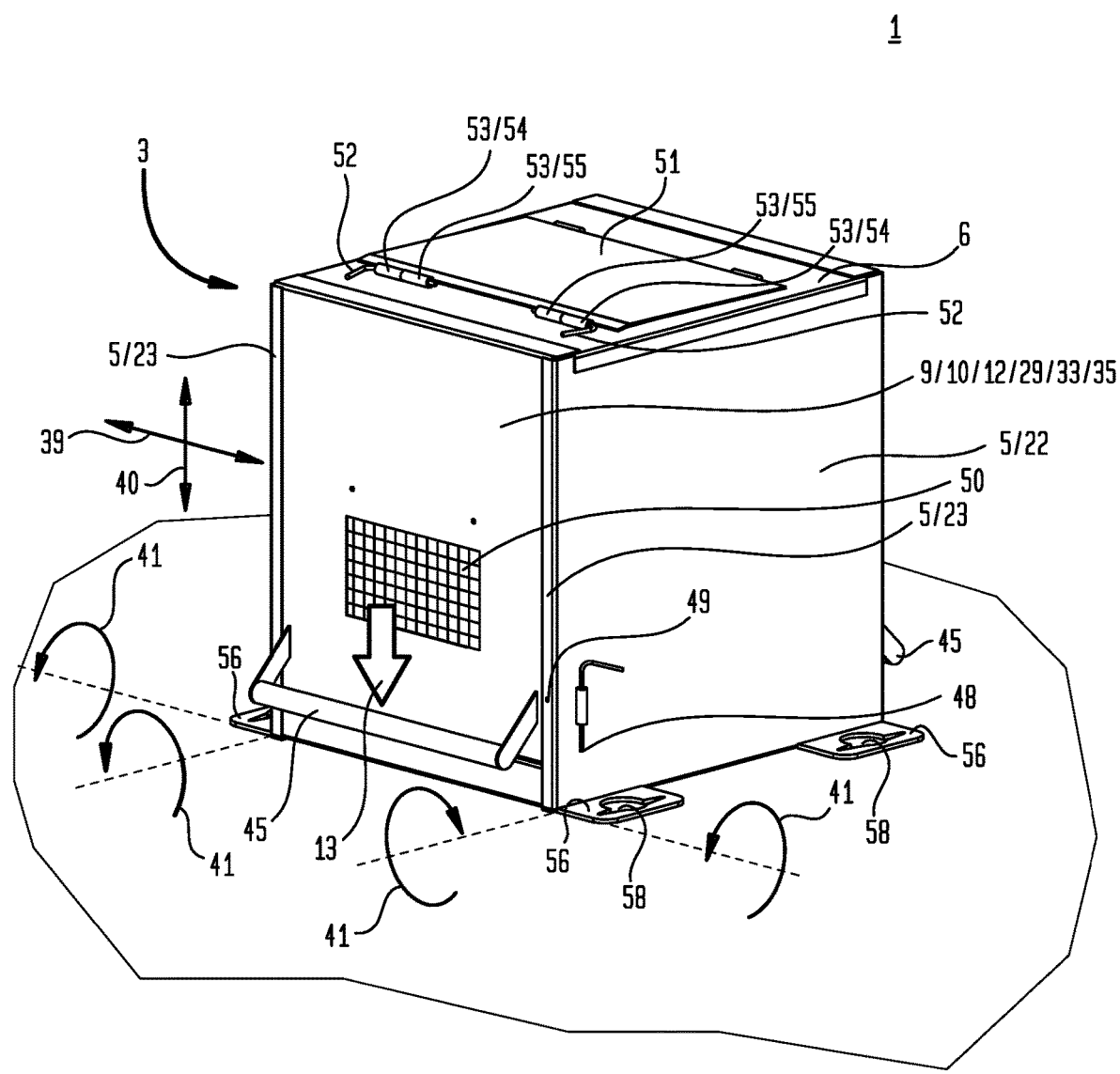
FIG. 6A is a perspective view of a particular embodiment of the selective access system having a first cover disposed in a first position and a second cover disposed in a first position.
Figure 6B:
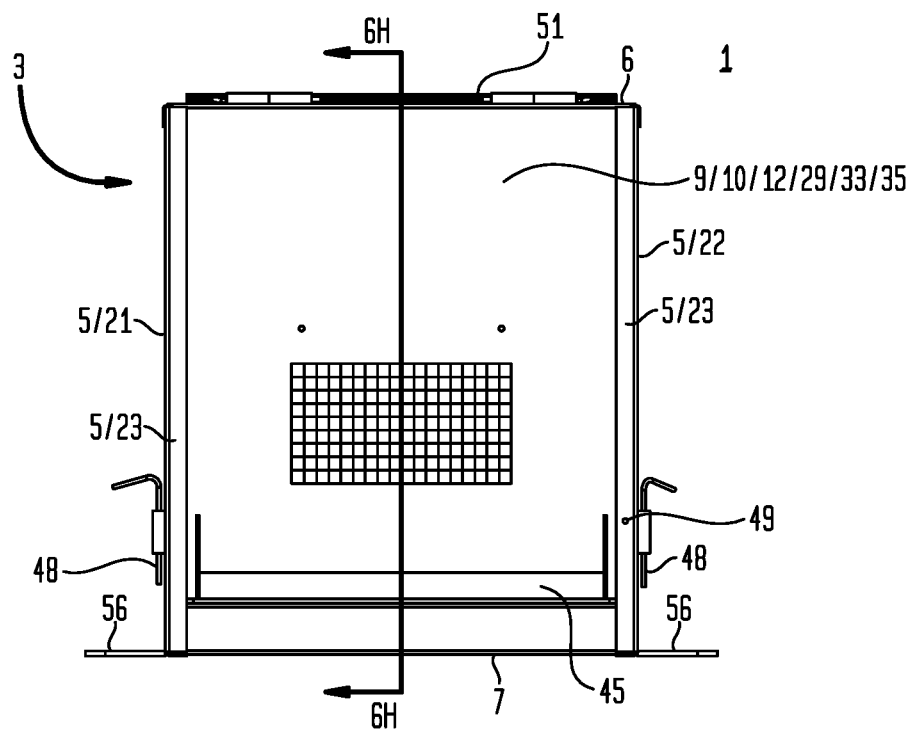
FIG. 6B is a front view of the particular embodiment of the selective access system shown in FIG. 6A.
Figure 6C:
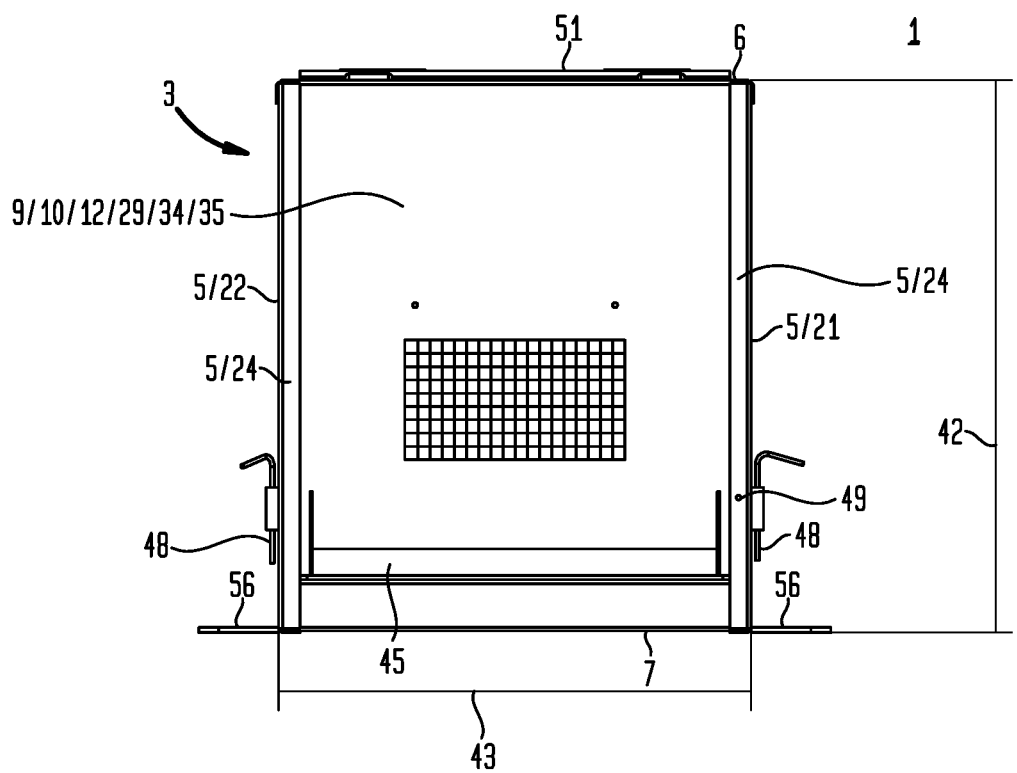
FIG. 6C is a rear view of the particular embodiment of the selective access system shown in FIG. 6A.
Figure 6D:
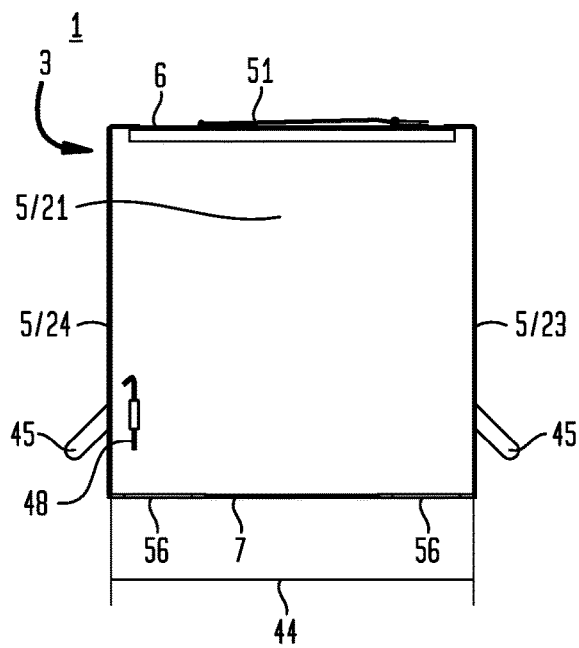
FIG. 6D is a first side view of the particular embodiment of the selective access system shown in FIG. 6A.
Figure 6E:
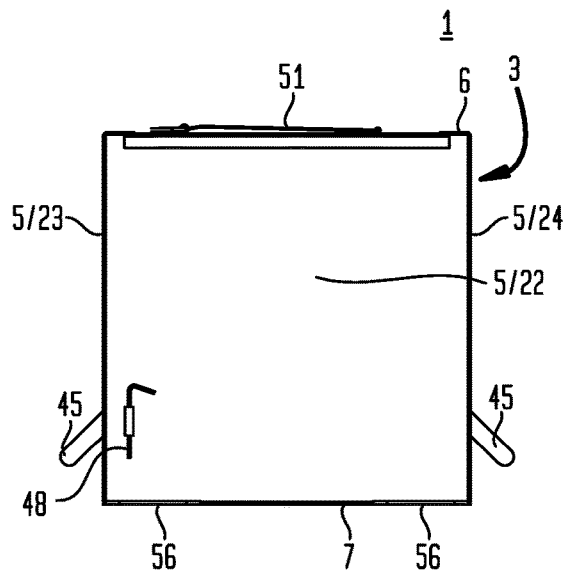
FIG. 6E is a second side view of the particular embodiment of the selective access system shown in FIG. 6A.
Figure 6F:
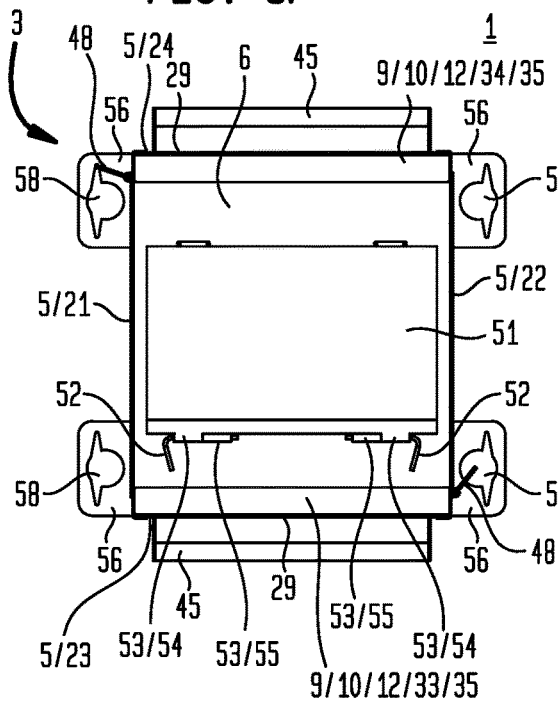
FIG. 6F is a top view of the particular embodiment of the selective access system shown in FIG. 6A.
Figure 6G:
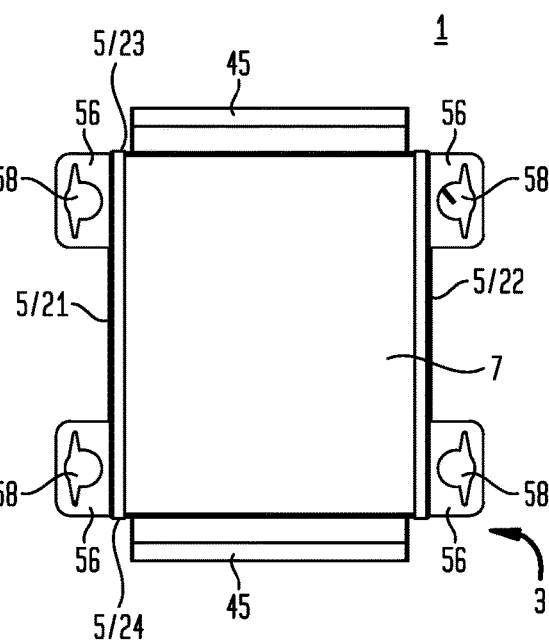
FIG. 6G is a bottom view of the particular embodiment of the selective access system shown in FIG. 6A.
Figure 6H:
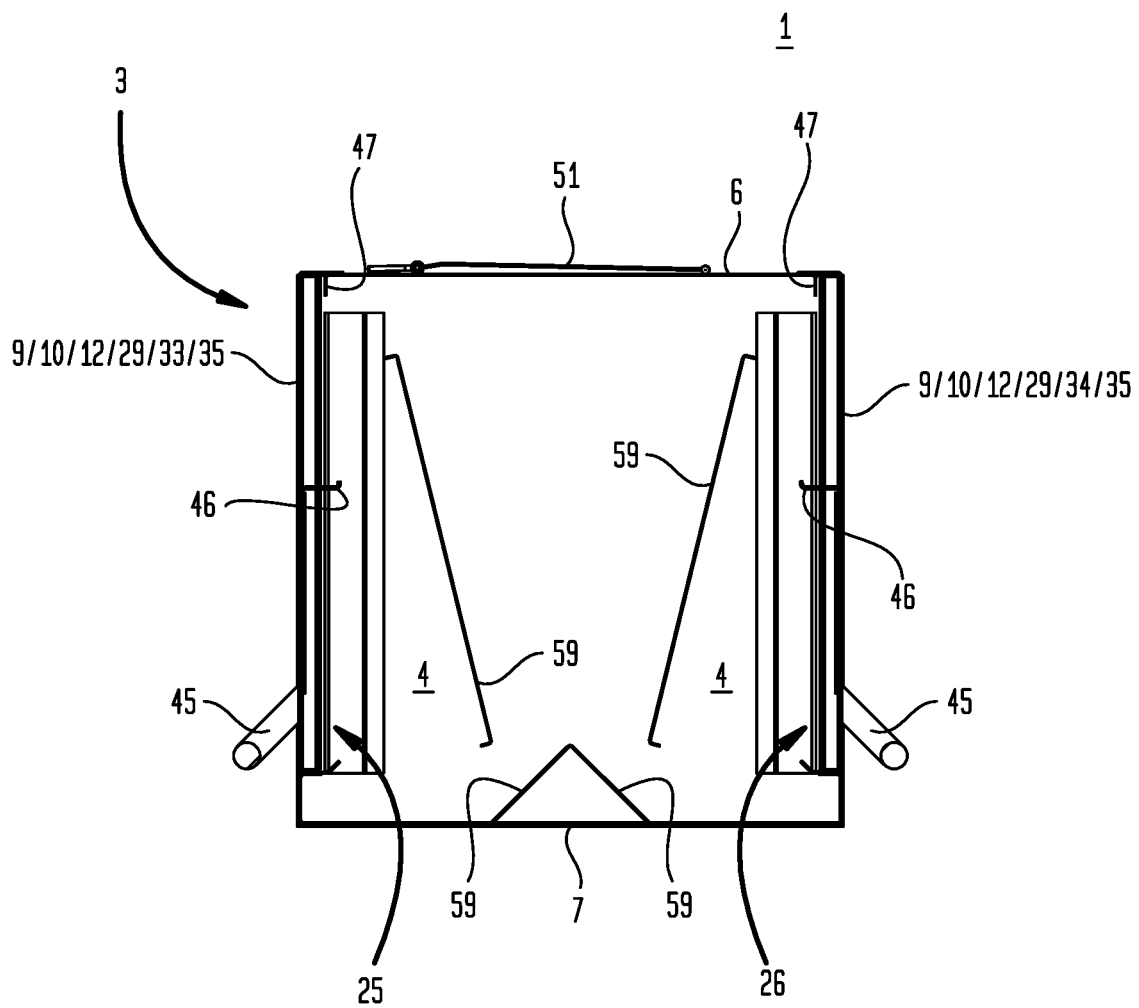
FIG. 6H is a cross-sectional view of the particular embodiment of the selective access system shown in FIG. 6B.
Figure 7A:
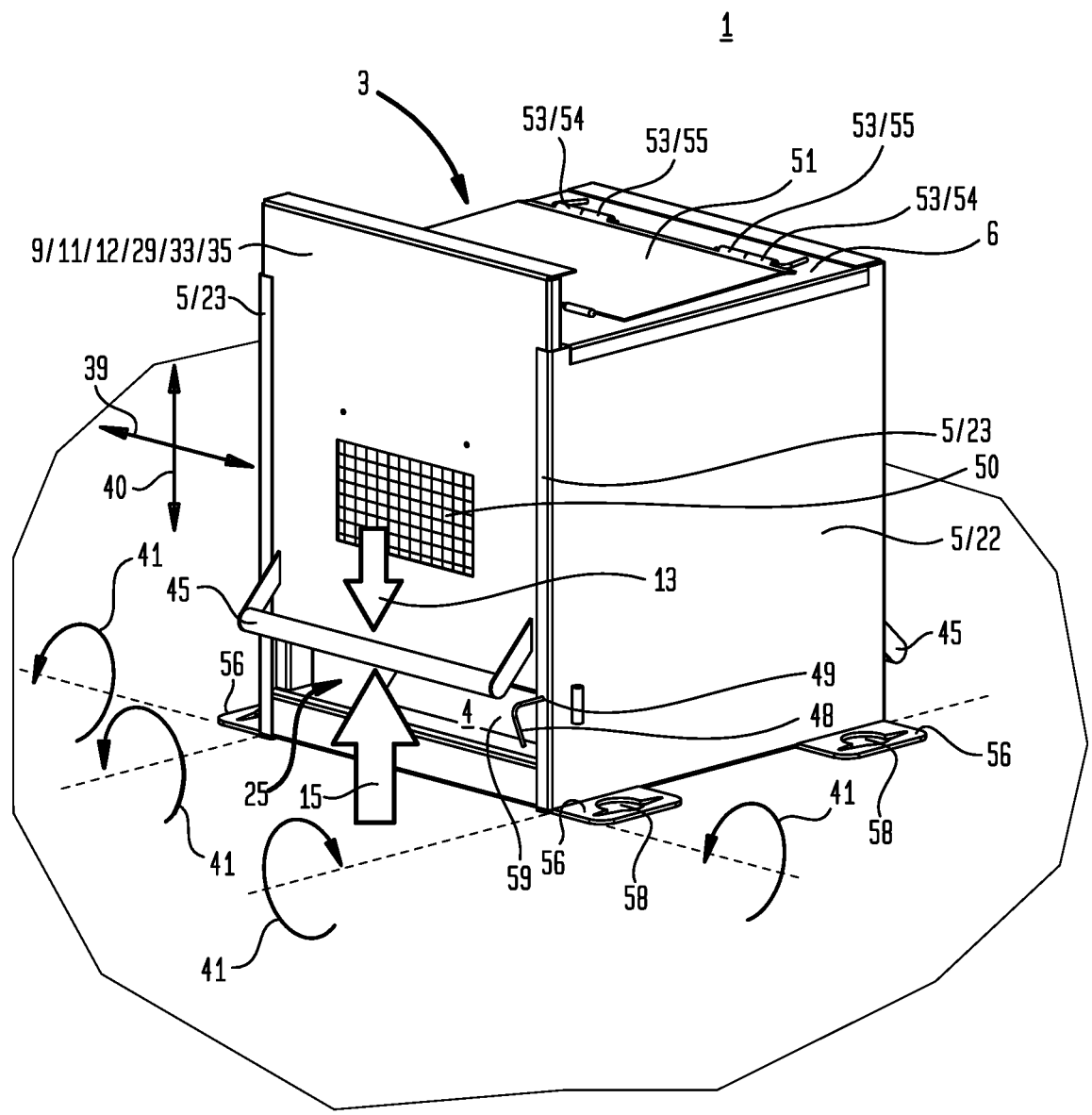
FIG. 7A is a perspective view of a particular embodiment of the selective access system having a first cover disposed in a second position and a second cover disposed in a first position.
Figure 7B:
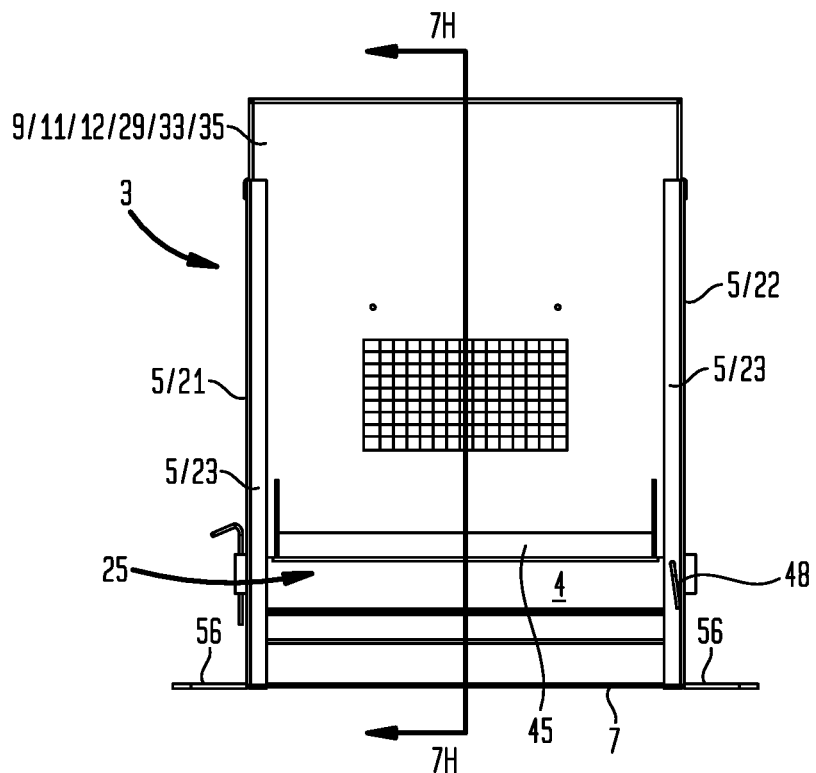
FIG. 7B is a front view of the particular embodiment of the selective access system shown in FIG. 7A.
Figure 7C:
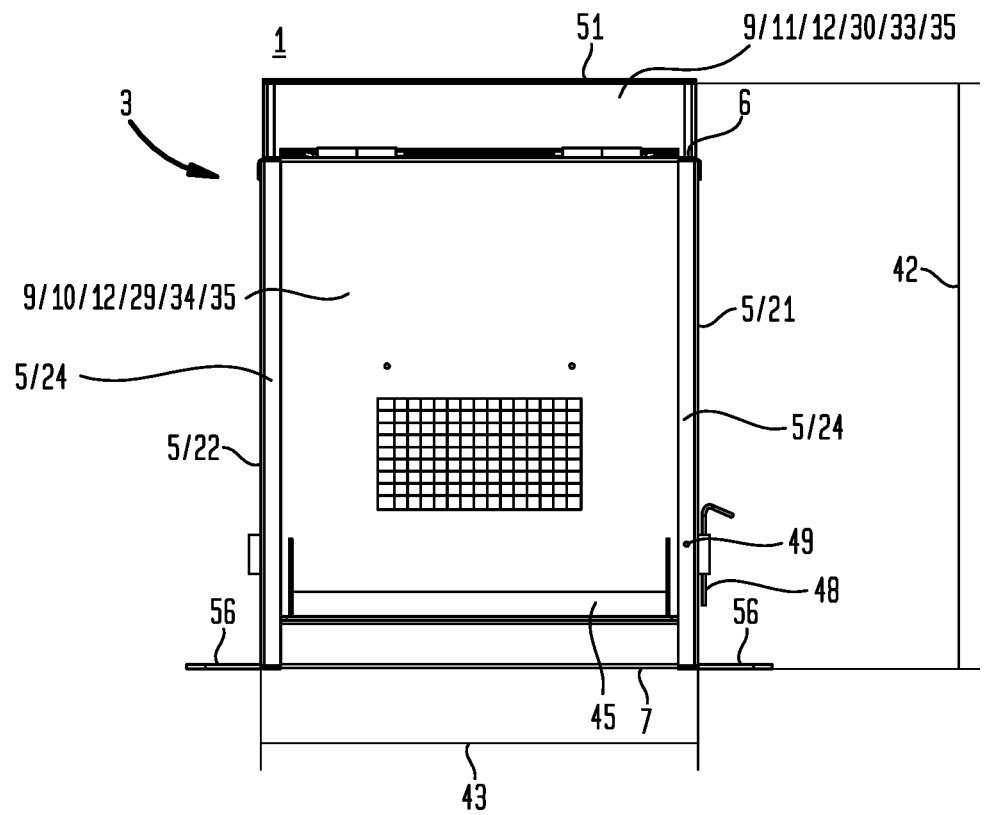
FIG. 7C is a rear view of the particular embodiment of the selective access system shown in FIG. 7A.
Figure 7D:
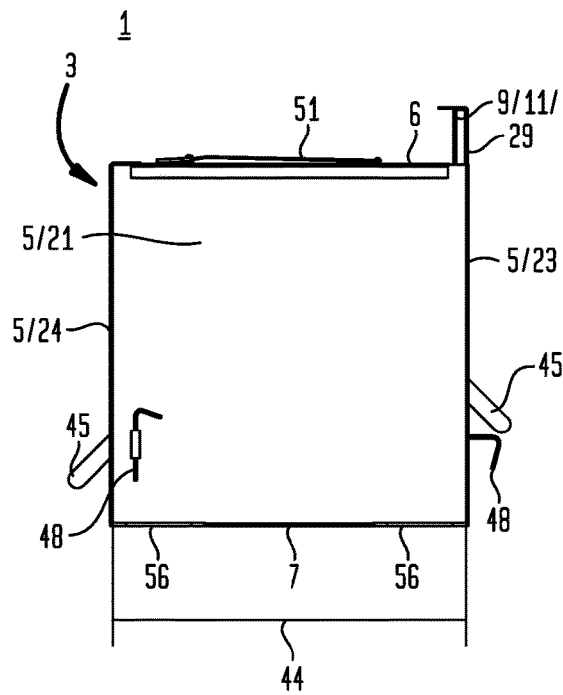
FIG. 7D is a first side view of the particular embodiment of the selective access system shown in FIG. 7A.
Figure 7E:
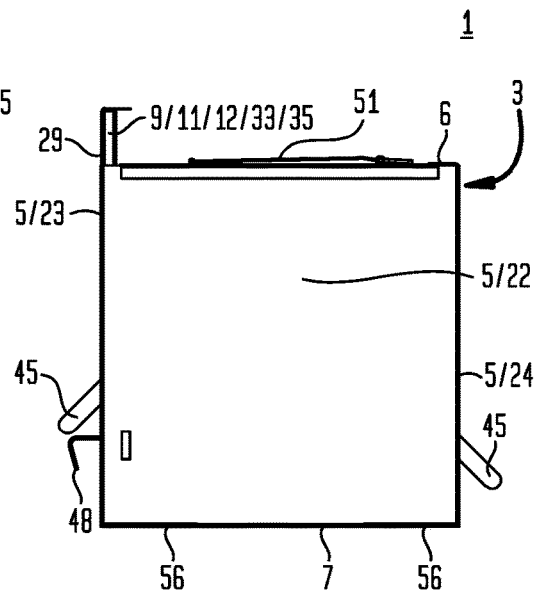
FIG. 7E is a second side view of the particular embodiment of the selective access system shown in FIG. 7A.
Figure 7F:
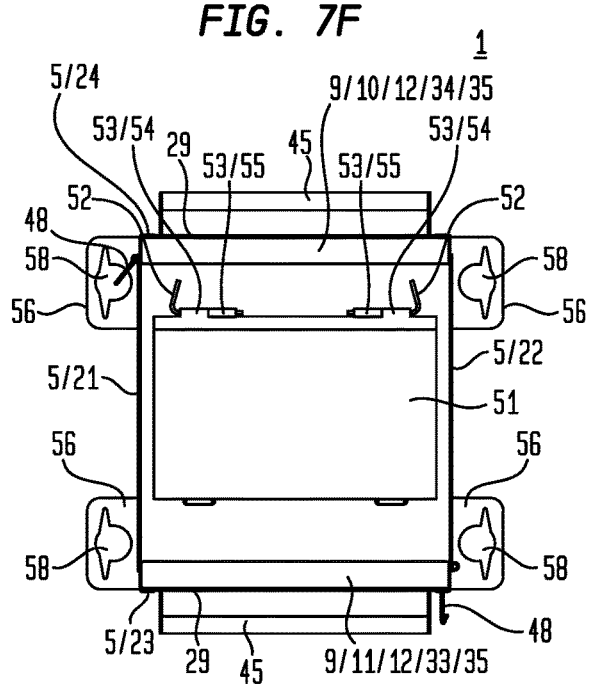
FIG. 7F is a top view of the particular embodiment of the selective access system shown in FIG. 7A.
Figure 7G:
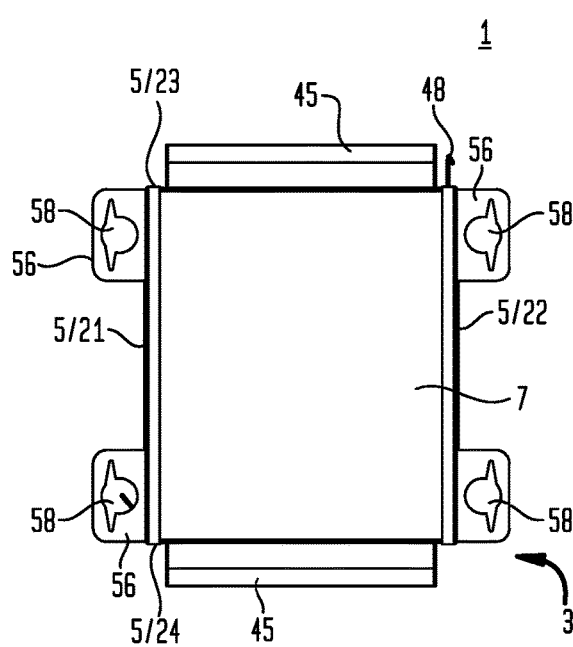
FIG. 7G is a bottom view of the particular embodiment of the selective access system shown in FIG. 7A.
Figure 7H:
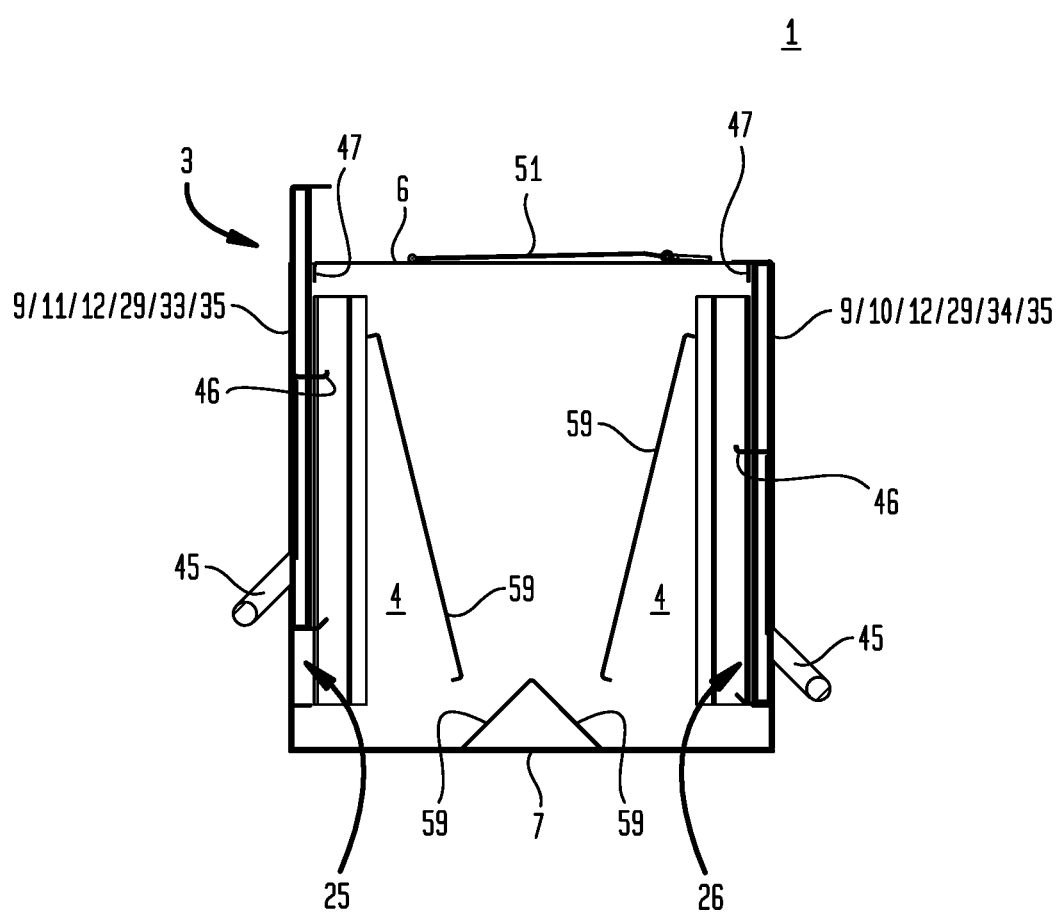
FIG. 7H is a cross-sectional view of the particular embodiment of the selective access system shown in FIG. 7B.
Figure 8A:
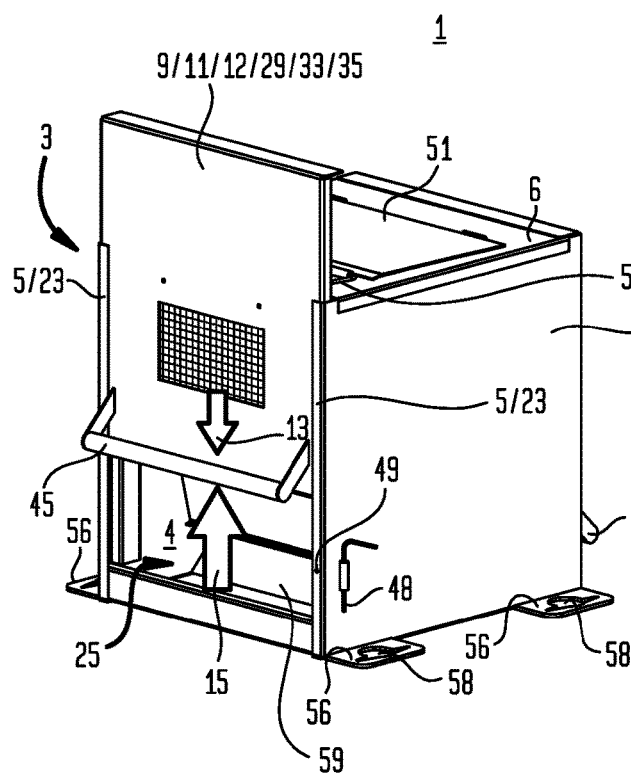
FIG. 8A is a perspective view of a particular embodiment of the selective access system having a first cover disposed in a second position and a second cover disposed in a first position.
Figure 8B:
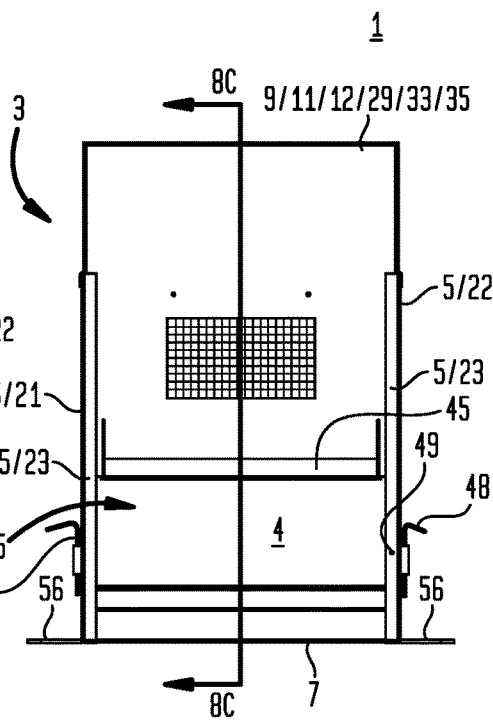
FIG. 8B is a front view of the particular embodiment of the selective access system shown in FIG. 8A.
Figure 8C:
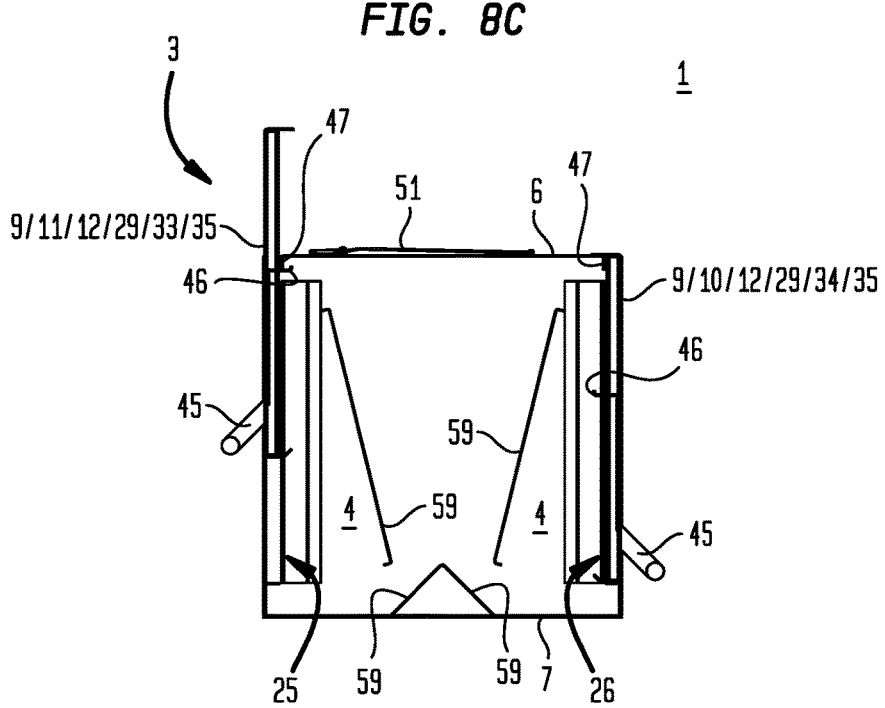
FIG. 8C is a cross-sectional view of the particular embodiment of the selective access system shown in FIG. 8B.

Now referring primarily to FIG. 1, which illustrates a method of using a particular embodiment of the instant selective access system (1) for permitting selective access to ingestible matter (2), whereby the selective access system (1) includes a container (3) having an interior space (4) defined by a side wall (5) disposed between opposing top and bottom walls (6)(7), and an opening (8) disposed within the side wall (5), whereby the opening (8) communicates with the interior space (4).

Further, the selective access system (1) includes a cover (9) slidably engaged with the container (3), whereby the cover (9) can slide upward and downward between a first position (10) and a second position (11). In the first position (10), the cover (9) overlays the opening (8), thereby precluding access to the interior space (4). In the second position (11), the cover (9) disposes away from or above at least a portion of the opening (8) to permit access to the interior space (4) and particularly, to permit access to ingestible matter (2) disposed within the interior space (4).

Still further, the selective access system (1) includes a force generator (12) coupled to the cover (9), whereby the force generator (12) generates a pre-selected force amount (13) which when unopposed, provides the first position (10) of the cover (9). Alternatively, the second position (11) of the cover (9) can be provided by a counterforce generator (14) which can generate a counterforce amount (15) which can be greater than the pre-selected force amount (13), thus opposing the pre-selected force amount (13) to dispose the cover (9) away from at least a portion of the opening (8) to permit access to ingestible matter (2) disposed within the interior space (4).

Again referring primarily to FIG. 1, the selective access system (1) can be used to facilitate management of one or more targeted animals (16), for example wild boars or feral hogs which can cause agricultural and/or environmental damage, by permitting selective access to ingestible matter (2), such as bait (17) including a toxic agent (18), while precluding non-targeted animals (19), such as livestock or wildlife other than wild boars or feral hogs, from accessing the bait (17) including the toxic agent (18).

As to particular embodiments, the bait (17) including the toxic agent (18) can, but need not necessarily, be akin to the bait disclosed in U.S. patent application Ser. No. 15/241,840, which is hereby incorporated by reference herein in its entirety.

For the purposes of the present invention, the term "selective" means of, relating to, or characterized by selection, whereby selection means the act of choosing something from a group.

For the purposes of the present invention, the term "access" means a way of being able to get something.

Various directional terms, such as top, bottom, side, front, rear, left, right, lateral, above, below, horizontal, vertical, upward, downward, and the like are used throughout this disclosure to provide a frame of reference (26) in conjunction with the figures to aid in the reader's understanding of the instant invention, and these directional terms should not be construed as limiting the scope of the invention or restricting the invention to the described orientation.

Now referring primarily to FIG. 2A through FIG. 4C, as stated above, the selective access system (1) includes a container (3) having an interior space (4) defined by a side wall (5) disposed between opposing top and bottom walls (6)(7). The container (3) can be configured to contain ingestible matter (2) and specifically, ingestible matter (2) can be disposed within the interior space (4) and correspondingly, the ingestible matter (2) can be surrounded by the side wall (5) and the opposing top and bottom walls (6)(7) except proximate the opening (8) disposed within the side wall (5).

It should be appreciated that the container (3) can have any of a numerous and wide variety of configurations and associated lengths, widths, and heights, sufficient to contain ingestible matter (2). As but one illustrative example, the container (3) can be configured as a cube or a cuboid, whereby the opposing top and bottom walls (6)(7) can (i) be generally planar, (ii) dispose in generally parallel spaced apart relation, and (iii) have a generally horizontal orientation in relation to a support surface (20) which supports the container (3). The side wall (5), which can also be generally planar, can couple the top and bottom walls (6)(7) and correspondingly, can (i) dispose in generally orthogonal or perpendicular relation to the top and bottoms walls (6)(7), and (ii) have a generally vertical orientation in relation to the generally horizontal top and bottom walls (6)(7).

As to particular embodiments, the side wall (5) can be formed from a plurality of side wall components (21)(22)(23)(24) coupled together to provide the side wall (5). To continue with the illustrative example above whereby the container (3) can be a cube or a cuboid, the container (3) can include opposing left and right side wall components (21)(22), which can (i) be generally planar, (ii) dispose in generally parallel spaced apart relation, and (iii) have a generally vertical orientation in relation to the generally horizontal top and bottom walls (6)(7).

The container (3) further includes an opening (8) disposed within the side wall (5), whereby the opening (8) communicates with the interior space (4). The opening (8) can have any of a numerous and wide variety of configurations and associated dimensional relations sufficient to provide a pass-through for passing matter, such as ingestible matter (2), out of the interior space (4). Continuing with the illustrative example above whereby the container (3) can be a cube or a cuboid having opposing left and right side wall components (21)(22), the opening (8) can be disposed within a front side wall component (23) which disposes between the opposing left and right side wall components (21)(22), or the opening (8) can span the entirety of a front portion of the container (3) between the opposing left and right side wall components (21)(22) and between the opposing top and bottom walls (6)(7).

Again referring primarily to FIG. 2A through FIG. 4C, as to particular embodiments, the container (3) can include only one opening (8) disposed within the side wall (5) between the opposing top and bottom walls (6)(7). For example, a cubical or cuboidal container (3) can have only one opening (8) disposed within the front side wall component (23), whereby the side wall (5) additionally includes a rear side wall component (24) which laterally couples the opposing left and right side wall components (21)(22) together. Thus, in this particular embodiment, the interior space (4) and correspondingly, ingestible matter (2) disposed within the interior space (4), can be surrounded by the front side wall component (23) except proximate the opening (8) disposed within the front side wall component (23), the opposing left and right side wall components (21)(22), the rear side wall component (24), and the opposing top and bottom walls (6)(7).

Now referring primarily to FIG. 6A through FIG. 8C, as to other particular embodiments, the container (3) can include a plurality of openings (8) disposed within the side wall (5) between the opposing top and bottom walls (6)(7). For example, a cubical or cuboidal container (3) can have a first opening (25) disposed within the front side wall component (23), and a second opening (26) disposed within the rear side wall component (24). Thus, in this particular embodiment, the interior space (4) and correspondingly, ingestible matter (2) disposed within the interior space (4), can be surrounded by the front side wall component (23) except proximate the first opening (25) disposed within the front side wall component (23), the rear side wall component (24) except proximate the second opening (26) disposed within the rear side wall component (24), the opposing left and right side wall components (21)(22), and the opposing top and bottom walls (6)(7).

As to particular embodiments, the left side wall component (21) and a portion of at least one of the front and rear side wall components (23)(24) can be integrated such that the left side wall component (21) and a portion of at least one of the front and rear side wall components (23)(24) are formed as a one-piece construct. Said another way, the left side wall component (21) and a portion of at least one of the front and rear side wall components (23)(24) can be integrally formed, meaning connected together so as to make up a single complete piece or unit, or so as to work together as a single complete piece or unit, and so as to be incapable of being easily dismantled without destroying the integrity of the piece or unit.

Continuing again with the illustrative example above whereby the container (3) can be a cube or a cuboid, a single piece of generally planar material having a medial portion disposed between opposing end portions can be bent proximate each end portion such that each end portion disposes in generally orthogonal relation to the medial portion. Following, the medial portion can provide the left side wall component (21), one of the end portions can provide a portion of the front side wall component (23), and/or the other of the end portions can provide a portion of the rear side wall component (24).

Moreover, the right side wall component (22) and a portion of at least one of the front and rear side wall components (23)(24) can be integrated such that the right side wall component (22) and a portion of at least one of the front and rear side wall components (23)(24) are formed as a one-piece construct. Said another way, the right side wall component (22) and a portion of at least one of the front and rear side wall components (23)(24) can be integrally formed, meaning connected together so as to make up a single complete piece or unit, or so as to work together as a single complete piece or unit, and so as to be incapable of being easily dismantled without destroying the integrity of the piece or unit.

Continuing again with the illustrative example above whereby the container (3) can be a cube or a cuboid, a single piece of generally planar material having a medial portion disposed between opposing end portions can be bent proximate each end portion such that each end portion disposes in generally orthogonal relation to the medial portion. Following, the medial portion can provide the right side wall component (22), one of the end portions can provide a portion of the front side wall component (23), and/or the other of the end portions can provide a portion of the rear side wall component (24).

Now referring primarily to FIG. 5A through FIG. 5H, the selective access system (1) further includes a cover (9) having opposing cover front and rear faces (29)(30) extending to a cover edge which defines a cover periphery, whereby the cover periphery can define any of a numerous and wide variety of configurations of varying dimensions, depending upon the opening (8) which the cover (9) is configured to overlay when the cover (9) disposes in the first position (10). As shown in the examples of the Figures, the cover (9) can be generally planar, having cover front and rear faces (29)(30) which are correspondingly generally planar and extend to a cover periphery which, for example, can be generally rectangular; however the instant invention need not be limited to this particular configuration.

The cover (9) can be configured to slidably engage with the container (3), whereby the cover (9) can slide (i) upward and downward between the first and second positions (10) (11), or (ii) vertically in relation to the top and bottom walls (6)(7) between the first and second positions (10)(11).

In the first position (10), the cover (9) overlays the opening (8), thereby precluding access to the interior space (4) via the opening (8). Said another way, the cover rear face (30) disposes laterally adjacent to the entirety of the opening (8), thus precluding access to the interior space (4) via the opening (8).

Now referring primarily to FIG. 2A through FIG. 4C, as to particular embodiments having only one opening (8) which disposes within a front side wall component (23), when in the first position (10), the cover (8) can cooperate with the front side wall component (23), the opposing left and right side wall components (21)(22), the rear side wall component (24), and the opposing top and bottom walls (6)(7) to surround the interior space (4) and correspondingly, ingestible matter (2) disposed within the interior space (4).

In the second position (11), the cover (9) disposes away from or above at least a portion of the opening (8) to permit access to the interior space (4) and particularly, to permit access to ingestible matter (2) disposed within the interior space (4). In other words, the cover rear face (30) does not dispose laterally adjacent to the entirety of the opening (8), thus permitting access to the interior space (4) via the opening (8).

The cover (9) can be configured to slidably engage with the container (3). Particularly, the cover (9) can be slidably coupled to the container (3) between the top and bottom walls (6)(7). As to particular embodiments, the cover (9) can be slidably engaged with the side wall (5).

Again referring primarily to FIG. 2A through FIG. 4C, as to particular embodiments of the container (3) having only one opening (8) which disposes within a front side wall component (23), the cover (9) can be slidably engaged with the front side wall component (23) and/or the left and right side wall components (21)(22). More specifically, a cover left edge (31) can be slidably engaged with the front side wall component (23) and/or the left side wall component (21), and a cover right edge (32) can be slidably engaged with the front side wall component (23) and/or the right side wall component (22).

Now referring primarily to FIG. 6A through FIG. 8C, as to particular embodiments of the container (3) including a plurality of openings (8), such as a first opening (25) disposed within a front side wall component (23) and a second opening (26) disposed within a rear side wall component (24), the selective access system (1) can include a corresponding plurality of covers (9), such as a first cover (33) disposed proximate the first opening (25) and a second cover (34) disposed proximate the second opening (26). As to these particular embodiments, when each of the first and second covers (33)(34) dispose in the first position (10), the first and second covers (33)(34) can cooperate with the corresponding front and rear side wall components (23)(24), the opposing left and right side wall components (21)(22), and the opposing top and bottom walls (6)(7) to surround the interior space (4) and correspondingly, ingestible matter (2) disposed within the interior space (4). Additionally, as to these particular embodiments, the first cover (33) can be slidably engaged with the front side wall component (23) and/or the left and right side wall components (21)(22), and the second cover (34) can be slidably engaged with the rear side wall component (24) and/or the left and right side wall components (21)(22). More specifically, a first cover left edge (31) can be slidably engaged with the front side wall component (23) and/or the left side wall component (21), and a first cover right edge (32) can be slidably engaged with the front side wall component (23) and/or the right side wall component (22); and, a second cover left edge (31) can be slidably engaged with the rear side wall component (24) and/or the left side wall component (21), and a second cover right edge (32) can be slidably engaged with the rear side wall component (24) and/or the right side wall component (22).

Now referring primarily to FIG. 1, FIG. 3A, FIG. 4A, FIG. 7A, and FIG. 8A, the selective access system (1) further includes a force generator (12) coupled to the cover (9), whereby the force generator (12) generates a pre-selected force amount (13). As relates to the present invention, selective access to the ingestible matter (2) disposed within the container (3) can be accomplished by pre-selecting a force amount of the force generator (12) such that only a counterforce generator (14), for example a targeted animal (16), can supply the counterforce amount (15) which can be greater than the pre-selected force amount (13).

Accordingly, only the targeted animal (16) (or a comparable counterforce generator (14)) can generate a sufficient counterforce amount (15) to oppose the pre-selected force amount (13) of the force generator (12) to provide the second position (11) of the cover (9), thereby disposing the cover (9) away from the opening (8) to permit access to ingestible matter (2), for example bait (17) including a toxic agent (18), disposed within the interior space (4).

In contrast, a non-targeted animal (19) may not able to supply a sufficient counterforce amount (15) to oppose the pre-selected force amount (13) of the force generator (12) and consequently, the non-targeted animal (19) may not able to provide the second position (11) of the cover (9). Correspondingly, the first position (10) of the cover (9) can be maintained, thereby precluding the non-targeted animal (19) from accessing the ingestible matter (2), for example bait (17) including a toxic agent (18), disposed within the interior space (4).

As to particular embodiments, the force generator (12) can be configured as a weight element (35) which generates the pre-selected force amount (13), whereby the pre-selected force amount (13) corresponds to the weight of the weight element (35) or the force of gravity on the weight element (35).

As to particular embodiments, the pre-selected force amount (13) generated by the weight element (35) can be selected to require the counterforce generator (14) to comprise a specific grouping of animals, whereby an individual animal within the specific grouping could supply a counterforce amount (15) which can be greater than the pre-selected force amount (13) to dispose the cover (9) in the second position (11), permitting access to ingestible matter (2), for example bait (17) including a toxic agent (18), disposed within the interior space (4).

As to particular embodiments, the specific grouping of animals can comprise a biological classification of animals, such as a taxonomic rank, whereby the taxonomic rank can be selected from the group including or consisting of: family, genus, and species.

As to particular embodiments, the family can be *Suidae*, to which pigs or swine belong.

As to particular embodiments, the genus can be *Sus*.

As to particular embodiments, the species can be *Sus scrofa*, whereby members of this species are commonly known as wild boars or feral hogs.

As to particular embodiments whereby wild boars or feral hogs comprise the targeted animals (16), the pre-selected force amount (13) of the weight element (35) can be equal to or greater than about 6.8 kilograms (about 15 pounds), which can be opposed by a typical wild boar or feral hog to provide the second position (11) of the cover (9), thereby disposing the cover (9) away from the opening (8) to permit access to ingestible matter (2), for example bait (17) including a toxic agent (18), disposed within the interior space (4).

Conversely, a non-targeted animal (19), which may typically be found to coexist with the wild boars or feral hogs, would not be able to supply a sufficient counterforce amount (15) to oppose the pre-selected force amount (13) of the force generator (12). Following, the non-targeted animal (19) would not able to provide the second position (11) of the cover (9); thus, the first position (10) of the cover (9) would be maintained and the non-targeted animal (19) would be precluded from accessing ingestible matter (2), for example bait (17) including a toxic agent (18), disposed within the interior space (4).

As but one illustrative example, an exemplary geographical region of the United States in which the selective access system (1) may be useful for facilitating management of targeted animals (16) comprising wild boars or feral hogs includes Texas, which is home to an estimated 2 million wild boars or feral hogs (about 50% of all the wild boars or feral hogs in the United States). Within this region, non-targeted animals (19) which may coexist with the wild boars or feral hogs include livestock such as cattle, goats, horses, and sheep (as non-limiting examples) and wildlife such as beavers, coyotes, deer, foxes, lizards, rattlesnakes, skunks, tortoises, and turkeys (as non-limiting examples).

As a result, an embodiment of the selective access system (1) useful in this region would have a pre-selected force amount (13) of the weight element (35) such that the pre-selected force amount (13) can be (a) lesser than a counterforce amount (15) which can be generated by a typical wild boar or feral hog and (b) greater than a counterforce amount (15) which can be generated by livestock such as cattle, goats, horses, and sheep (as non-limiting examples) and wildlife such as beavers, coyotes, deer, foxes, lizards, rattlesnakes, skunks, tortoises, and turkeys (as non-limiting examples). Research suggests that a weight element (35) having a pre-selected force amount (13) in a range of between about 6.8 kilograms (about 15 pounds) to about 15.9 kilograms (about 35 pounds) meets both criteria (a) and (b).

As to particular embodiments whereby wild boars or feral hogs comprise the targeted animals (16), the pre-selected force amount (13) of the weight element (35) can be in a range selected from the group including or consisting of: between about 6.8 kilograms and about 8.8 kilograms; between about 7.8 kilograms and about 9.8 kilograms; between about 8.8 kilograms and about 10.8 kilograms; between about 9.8 kilograms and about 11.8 kilograms; between about 10.8 kilograms and about 12.8 kilograms; between about 11.8 kilograms and about 13.8 kilograms; between about 12.8 kilograms and about 14.8 kilograms; and between about 13.8 kilograms and about 15.9 kilograms. As but one illustrative example, the pre-selected force amount (13) of the weight element (35) can be about 8.4 kilograms (about 18.6 pounds).

As to particular embodiments whereby wild boars or feral hogs comprise the targeted animals (16), the pre-selected force amount (13) of the weight element (35) can be equal to or greater than a weight selected from the group including or consisting of: about 6.8 kilograms; about 7.8 kilograms; about 8.8 kilograms; about 9.8 kilograms; about 10.8 kilograms; about 11.8 kilograms; about 12.8 kilograms; about 13.8 kilograms; and about 14.8 kilograms.

As to particular embodiments, the weight element (35) can be integrated with the cover (9) such that the weight element (35) and the cover (9) are formed as a one-piece construct. Said another way, the weight element (35) and the cover (9) can be integrally formed, meaning connected together so as to make up a single complete piece or unit, or so as to work together as a single complete piece or unit, and so as to be incapable of being easily dismantled without destroying the integrity of the piece or unit. Accordingly, a cover weight provides the weight element (35), whereby the cover weight can be provided by the material which forms the cover (9).

As to particular embodiments, the cover weight can be generally uniformly distributed within a cover periphery (36) which bounds the cover (9). As to particular embodiments of the selective access system (1) having a generally planar cover (9) with generally planar cover front and rear faces (29)(30), the generally uniform distribution of the cover weight can be provided by a generally uniform cover thickness between the cover front and rear faces (29)(30).

As to particular embodiments, the cover (9) can be formed from steel. As but one illustrative example, the cover (9) can be formed from at least 14 gauge steel, whereby the cover (9) can have a cover height (37) of about 0.63 meters and a cover length (38) of about 0.59 meters, thereby having a cover weight of about 8.4 kilograms (about 18.6 pounds). Notably, the instant cover (9) may be in stark contrast to doors of conventional feral pig bait delivery devices, such as the HOG HOPPER™ produced by Animal Control Technologies (Australia) Pty Ltd, whereby the door of the HOG HOPPER™ is made from lightweight aluminum and is only about 3.5 kilograms (about 7.7 pounds).

Now referring primarily to FIG. 2A, FIG. 3A, FIG. 6A, and FIG. 7A, the selective access system (1) including the container (3) and the cover (9) can together have a selective access system weight which, either solely or cooperatively, can be sufficient to preclude movement of the selective access system (1) when in use, whereby the selective access system weight may preclude lateral movement (39), vertical movement (40), and/or pivotal movement (41). Regarding the latter, the pivotal movement (41) can be about pivot axes defined or provided by each bottom edge of the container (3), whereby pivotal movement or tipping can be the result of the application of a tipping force. Because the instant invention may be used in areas which harbor animals, such as bears, that may attempt to tip the selective access system (1), having a sufficient selective access system weight to prevent such tipping can be an important aspect of the instant invention.

As to particular embodiments, the selective access system weight can be at least about 29.5 kilograms (65 pounds). As to particular embodiments, the selective access system weight can be selected from the group including or consisting of: at least about 29.5 kilograms; at least about 30 kilograms; at least about 40 kilograms; at least about 50 kilograms; at least about 60 kilograms; at least about 70 kilograms; at least about 80 kilograms; and at least about 90 kilograms. As but one illustrative example, the selective access system weight can be about 33.5 kilograms (about 74 pounds). As but a second illustrative example, the selective access system weight can be about 57 kilograms (about 126 pounds).

As to particular embodiments, like the cover (9), the container (3) including the side wall (5) and the top and bottom walls (6)(7) can be formed from steel. As but one illustrative example, the container (3) can be formed from at least 16 gauge steel.

Now referring primarily to FIG. 2C, FIG. 2D, FIG. 3C, and FIG. 3D, as but one illustrative example, the container (3) can have a container height (42) of about 0.7 meters, a container length (43) of about 0.6 meters, and a container width (44) of about 0.35 meters, thereby having a container weight of about 25.1 kilograms (about 55.4 pounds). Correspondingly, in combination with one of the above-described covers (9) having a cover weight of about 8.4 kilograms (about 18.6 pounds), the selective access system weight can be about 33.6 kilograms (about 74 pounds).

Now referring primarily to FIG. 6C, FIG. 6D, FIG. 7C, and FIG. 7D, as but a second illustrative example, the container (3) can have a container height (42) of about 0.94 meters, a container length (43) of about 0.6 meters, and a container width (44) of about 0.69 meters, thereby having a container weight of about 40.3 kilograms (about 88.8 pounds). Correspondingly, in combination with two of the above-described covers (9), each having a cover weight of about 8.4 kilograms (about 18.6 pounds), the selective access system weight can be about 57.2 kilograms (about 126 pounds).

Of note, the instant container (3) may be in stark contrast to that of the HOG HOPPER™ which is made from lightweight aluminum and is only about 20.7 kilograms (about 45.6 pounds).

As to particular embodiments, the selective access system (1) can, but need not necessarily, further include a cover actuator (45) coupled to the cover (9) in spaced apart relation, whereby the cover actuator (45) may be useful to facilitate upward sliding travel of the cover (9) to dispose the cover (9) in the second position (11), thus permitting access to the interior space (4) and particularly, to ingestible matter (2) disposed within the interior space (4).

As but one illustrative example, the cover actuator (45) can be configured as an elongate member, such as a rod, which outwardly extends from the cover front face (29) between the cover left and right edges (31)(32).

As to particular embodiments, the selective access system (1) can, but need not necessarily, further include a stop assembly coupled to the selective access system (1), whereby the stop assembly may be useful to stop or arrest upward sliding travel of the cover (9) relative to the container (3).

Now referring primarily to FIG. 2H, FIG. 3H, FIG. 4C, FIG. 5B, FIG. 5D, FIG. 5E, FIG. 5F, FIG. 6H, FIG. 7H, and FIG. 8C, as to particular embodiments, the stop assembly can include a stop element (46) coupled to the cover (9). For example, the stop element (46) can be fixedly coupled to the cover (9), meaning that the stop element (46) can be immovably affixed or joined to the cover (9). Thus, the stop element (46) can move along with the cover (9) during upward sliding travel of the cover (9).

Further, the stop assembly can include an engagement element (47) coupled to the container (3). For example, the engagement element (47) can be fixedly coupled to the container (3), meaning that the engagement element (47) can be immovably affixed or joined to the container (3). As to particular embodiments, the engagement element (47) can be integrated with the container (3). For example, the engagement element (47) can be integrated with the side wall (5) or the top wall (6), meaning that the engagement element (47) and the respective side wall (5) or top wall (6) can be formed as a one-piece construct.

In use, upward sliding travel of the cover (9) can be stopped upon engagement, for example abutting engagement, of the stop element (46) with the engagement element (47). Consequently, the stop assembly can preclude upward sliding travel of the cover (9) beyond where the stop element (46) abuttingly engages with the engagement element (47).

Again referring primarily to FIG. 2H, FIG. 3H, FIG. 4C, FIG. 5B, FIG. 5D, FIG. 5E, FIG. 5F, FIG. 6H, FIG. 7H, and FIG. 8C, at least one of the stop element (46) and the engagement element (47) can be disposed proximate or on the internal surface of the selective access system (1), as opposed to being disposed proximate or on the external surface of the selective access system (1). Accordingly, at least one of the stop element (46) and the engagement element (47) can be disposed within the interior space (4).

For example, the stop element (46) can be configured as a protrusion which outwardly extends from the cover rear face (30). Following, when the cover (9) slidably engages with the container (3) such that the cover rear face (30) disposes toward the interior space (4), the stop element (46) can inwardly extends from the cover (9) toward or into the interior space (4).

As to particular embodiments, both the stop element (46) and the engagement element (47) can be disposed proximate or on the internal surface of the selective access system (1), as opposed to being disposed proximate or on the external surface of the selective access system (1). Accordingly, both the stop element (46) and the engagement element (47) can be disposed within the interior space (4).

Notably, disposing the stop element (46) and/or the engagement element (47) within the interior space (4) to provide an internal stop assembly can serve to protect the stop assembly from a force outside of the selective access system (1), as the container (3) and the cover (9) bound or surround the stop element (46) and/or the engagement element (47) and accordingly, preclude access to the stop element (46) and/or the engagement element (47) from outside of the selective access system (1). The instant internal stop assembly may be advantageous in relation to a stop assembly having one or more components which dispose proximate or on the external surface of the selective access system (1), herein referred to as an external stop assembly, which may be relatively easily accessible from outside of the selective access system (1). Following, one or more components of an external stop assembly may be more easily uncoupled from the selective access system (1) by a force outside of the selective access system (1). As an example, an animal outside of the selective access system (1) which is attracted to the ingestible matter (2) disposed within the interior space (4) may provide a sufficient amount of force to uncouple the stop element (46) and/or the engagement element (47) of the external stop assembly from the selective access system (1), thus permitting the cover (9) to upwardly slide without restriction and even possibly permitting the cover (9) to be uncoupled from the container (3), thereby allowing non-selective access to the interior space (4) and correspondingly, ingestible matter (2) disposed within the interior space (4).

Worth mentioning, the instant internal stop assembly may be in stark contrast to the nudge bar and the upper door stop of the HOG HOPPER™, as both the nudge bar and the upper door stop are disposed proximate or on the external surface of the HOG HOPPER™ and in particular, outwardly extend from the door.

As to particular embodiments, the selective access system (1) can, but need not necessarily, further include a prop (48) which may be useful to support the cover (9) in the second position (11) to permit non-selective access to ingestible matter (2) disposed within the interior space (4), for example to train or condition targeted animals (16), such as wild boars or feral hogs, to access and eat ingestible matter (2) from the selective access system (1). Of note, for this training or conditioning, the ingestible matter (2) may comprise bait (17) which does not include a toxic agent (18).

As to particular embodiments, the prop (48) can be configured for reception within a bore (49) disposed within the container (3), for example within the side wall (5) proximate the cover (9). As but one illustrative example, the prop (48) can be configured as a discrete pin which may or may not be coupled to the container (3).

Upon reception within the bore (49), the prop (48) can support the cover (9) in the second position (11). Upon disengaging the prop (48) from the bore (49), the cover (9) can return to the first position (10).

As to particular embodiments, the selective access system (1) can, but need not necessarily, further include one or more relatively small aperture elements (50) disposed within the cover (9) to communicate between the cover front and rear faces (29)(30). The aperture elements (50) can be sized to permit air flow between the interior space (4) and the outside environment, whereby the aperture elements (50) can allow scent or odor associated with ingestible matter (2) disposed within the interior space (4) to egress from the selective access system (1), which may attract a targeted animal (16) to the ingestible matter (2).

As to particular embodiments, the selective access system (1) can, but need not necessarily, further include an access door (51) coupled to the container (3), for example via pivotal coupling to the top wall (6) of the container (3). Upon opening of the door (51) to an open position, the interior space (4) can be accessed, for example to dispose ingestible matter (2) within the interior space (4).

As to particular embodiments, the selective access system (1) can, but need not necessarily, further include a catch (52) and a corresponding catch-receiving element (53) which may be useful to secure or lock the door (51) in a closed position to preclude access to the interior space (4) via the door (51). As but one illustrative example, the catch (52) can be configured as a discrete pin which may or may not be coupled to the container (3), and the corresponding catch-receiving element (53) can have a catch-receiving element first portion (54) fixedly coupled to the door (51) and a catch-receiving element second portion (55) fixedly coupled to the top wall (6) proximate the door (51). Upon alignment of the catch-receiving element first and second portions (54)(55) and engagement of the catch (52) with the aligned catch-receiving element first and second portions (54)(55), the door (51) can be secured or locked in the closed position (11). Upon disengaging the catch (62) and the catch-receiving element (53), the door (9) can be disposed in the open position (10).

As to particular embodiments, the selective access system (1) can, but need not necessarily, further include an anchor assembly (56) which may be useful to anchor the selective access system (1) to a support surface (20) which supports the container (3), thereby precluding lateral movement (39), vertical movement (40), and/or pivotal movement (41) of the selective access system (1).

As but one illustrative example, the anchor assembly (56) can include an anchor (57), which may or may not be coupled to the container (3), and a corresponding anchor-receiving element (58) fixedly coupled to the container (3), for example proximate the bottom wall (7). Upon reception within the anchor-receiving element (58), the anchor (57) and the anchor-receiving element (58) can anchor the selective access system (1) to a support surface (20).

Now referring primarily to FIG. 2H, FIG. 3H, FIG. 4C, FIG. 6H, FIG. 7H, and FIG. 8C, as to particular embodiments, the selective access system (1) can, but need not necessarily, further include an ingestible matter guiding assembly (59) disposed within the interior space (4), whereby the ingestible matter guiding assembly (59) may be useful to guide or direct ingestible matter (2) toward the opening (8).

As but one illustrative example, the ingestible matter guiding assembly (59) can include at least one guide plate coupled to the container (3) and disposed within the interior space (4), whereby the guide plate can extend between the left and right side wall components (21)(22). Further, the guide plate can dispose in angled relation to the front side wall component (23).

Now regarding production, a method of making a particular embodiment of the instant selective access system (1) includes providing a container (3) including an interior space (4) defined by a side wall (5) disposed between opposing top and bottom walls (6)(7); disposing an opening (8) within the side wall (5), the opening (8) communicating with the interior space (4); slidably engaging a cover (9) with the container (3), the cover (9) configured to slide upward and downward between a first position (10) and a second position (11); whereby in the first position (10), the cover (9) overlays the opening (8); and whereby in the second position (11), the cover (9) disposes away from at least a portion of the opening (8) to permit access to the interior space (4); and coupling a force generator (12) to the cover (9), the force generator (12) generating a pre-selected force amount (13) which when unopposed, provides the first position (10) of the cover (9).

As to particular embodiments, the method can further include coupling a stop assembly to the selective access system (1), the stop assembly including a stop element (46) and an engagement element (47); whereby engagement of the stop element (46) with the engagement element (47) stops upward sliding travel of the cover (9); and disposing at least one of the stop element (46) and the engagement element (47) within the interior space (4).

The method of making particular embodiments of the instant selective access system (1) can further include providing additional components of the selective access system (1) as described above and in the claims.

Now regarding use, a method of using a particular embodiment of the instant selective access system (1) includes obtaining a selective access system (1) including a container (3) comprising an interior space (4) defined by a side wall (5) disposed between opposing top and bottom walls (6)(7); an opening (8) disposed within the side wall (5), the opening (8) communicating with the interior space (4); a cover (9) slidably engaged with the container (3), the cover (9) configured to slide upward and downward between a first position (10) and a second position (11); whereby in the first position (10), the cover (9) overlays the opening (8); and whereby in the second position (11), the cover (9) disposes away from at least a portion of the opening (8) to permit access to the interior space (4); and a force generator (12) coupled to the cover (9), the force generator (12) generating a pre-selected force amount (13) which when unopposed, provides the first position (10) of the cover (9). The method further includes disposing ingestible matter (2) within the interior space (4); and disposing the cover (4) in the first position (10).

The method of using particular embodiments of the instant selective access system (1) can further include using additional components of the selective access system (1) as described above and in the claims.

As can be easily understood from the foregoing, the basic concepts of the present invention may be embodied in a variety of ways. The invention involves numerous and varied embodiments of a selective access system and methods for making and using such a selective access system, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "cover" should be understood to encompass disclosure of the act of "covering"—whether explicitly discussed or not—and, conversely, were there effectively disclosure of the act of "covering", such a disclosure should be understood to encompass disclosure of a "cover" and even a "means for covering". Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant(s) should be understood to claim at least: i) each of the selective access systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A selective access system comprising:
   a container comprising an interior space defined by a side wall disposed between opposing top and bottom walls;
   an opening disposed within said side wall, said opening communicating with said interior space;
   a cover slidably engaged with said container, said cover configured to slide upward and downward between a first position and a second position;
   wherein in said first position, said cover overlays said opening; and
   wherein in said second position, said cover disposes away from at least a portion of said opening to permit access to said interior space;
   a force generator coupled to said cover, said force generator generating a pre-selected force amount which when unopposed, provides said first position of said cover;
   a stop assembly coupled to said selective access system, said stop assembly comprising a stop element and an engagement element;
   said stop element connected to said cover to inwardly extend from said cover into said interior space;
   said engagement element connected to at least one of said side wall or said top wall to inwardly extend from said container into said interior space;
   wherein when said cover disposes in said first position, said stop element and said engagement element dispose in vertically spaced apart relation and are disengaged from one another;
   wherein upon upward sliding travel of said cover, said stop element abuttingly engages with said engagement element to stop further upward sliding travel of said cover; and wherein said container and said cover entirely surround said stop element and said engagement element to preclude access to said stop element and said engagement element from outside of said selective access system; and a cover actuator connected to said cover to facilitate disposition of said cover in said second position.

2. The selective access system of claim 1, wherein said stop element comprises a protrusion which outwardly extends from a cover rear face of said cover.

3. The selective access system of claim 1, wherein said force generator comprises a weight element which generates said pre-selected force amount.

4. The selective access system of claim 3, wherein said pre-selected force amount is not less than about 6.8 kilograms.

5. The selective access system of claim 3, wherein said weight element is integrated with said cover.

6. The selective access system of claim 1, further comprising a prop and a bore; wherein upon reception within said bore, said prop supports said cover in said second position.

7. The selective access system of claim 1, further comprising an access door pivotally coupled to said top wall.

8. The selective access system of claim 1, further comprising an anchor assembly to facilitate anchoring said selective access system to a support surface.

9. The selective access system of claim 1, wherein only one said opening is disposed within said side wall.

10. The selective access system of claim 1, further comprising a plurality of said openings disposed within said side wall.

11. The selective access system of claim 10, further comprising:
a first opening disposed within a front side wall component of said side wall; and
a second opening disposed within a rear side wall component of said side wall.

12. The selective access system of claim 11, further comprising:
a first cover disposed proximate said first opening; and
a second cover disposed proximate said second opening.

13. A selective access system comprising:
a container comprising an interior space defined by a side wall disposed between opposing top and bottom walls;
an opening disposed within said side wall, said opening communicating with said interior space;
a cover slidably engaged with said container, said cover configured to slide upward and downward between a first position and a second position;
wherein in said first position, said cover overlays said opening; and
wherein in said second position, said cover disposes away from at least a portion of said opening to permit access to said interior space;
a force generator coupled to said cover, said force generator generating a pre-selected force amount which when unopposed, provides said first position of said cover; and
a stop assembly coupled to said selective access system, said stop assembly comprising a stop element and an engagement element;
said stop element connected to said cover to inwardly extend from said cover into said interior space;
said engagement element connected to at least one of said side wall or said top wall to inwardly extend from said container into said interior space;

wherein when said cover disposes in said first position, said stop element and said engagement element dispose in vertically spaced apart relation and are disengaged from one another;
wherein upon upward travel of said cover, said stop element abuttingly engages with said engagement element to stop further upward travel of said cover; and
wherein said container and said cover entirely surround said stop element and said engagement element to preclude access to said stop element and said engagement element from outside of said selective access system.

14. The selective access system of claim 13, further comprising a cover actuator coupled to said cover to facilitate disposition of said cover in said second position.

15. The selective access system of claim 13, wherein said stop element comprises a protrusion which outwardly extends from a cover rear face of said cover.

16. The selective access system of claim 13, wherein said force generator comprises a weight element which generates said pre-selected force amount, said weight element integrated with said cover.

17. A selective access system comprising:
a container comprising an interior space defined by a side wall disposed between opposing top and bottom walls;
an opening disposed within said side wall, said opening communicating with said interior space;
a cover slidably engaged with said container, said cover configured to slide upward and downward between a first position and a second position;
wherein in said first position, said cover overlays said opening; and
wherein in said second position, said cover disposes away from at least a portion of said opening to permit access to said interior space;
a force generator coupled to said cover, said force generator generating a pre-selected force amount which when unopposed, provides said first position of said cover; and
a stop assembly coupled to said selective access system, said stop assembly comprising a stop element and an engagement element;
said stop element coupled to said cover to inwardly extend from said cover into said interior space;
said engagement element coupled to at least one of said side wall or said top wall to inwardly extend from said container into said interior space;
wherein when said cover disposes in said first position, said stop element and said engagement element dispose in vertically spaced apart relation and are disengaged from one another;
wherein upon upward sliding travel of said cover, said stop element abuttingly engages with said engagement element to stop further upward sliding travel of said cover; and
wherein said container and said cover entirely surround said stop element and said engagement element to preclude access to said stop element and said engagement element from outside of said selective access system.

18. The selective access system of claim 17, further comprising a cover actuator coupled to said cover to facilitate disposition of said cover in said second position.

19. The selective access system of claim 17, wherein said stop element comprises a protrusion which outwardly extends from a cover rear face of said cover.

20. The selective access system of claim 17, wherein said force generator comprises a weight element which generates said pre-selected force amount, said weight element integrated with said cover.

* * * * *